United States Patent
Washiya et al.

(10) Patent No.: US 9,959,051 B2
(45) Date of Patent: May 1, 2018

(54) STORAGE SYSTEM AND STORAGE CONTROL METHOD TO SELECT PATH FOR TRANSMITTING COMMAND VIA SAS EXPANDERS

(71) Applicant: Hitachi, Ltd., Tokyo (JP)

(72) Inventors: Koji Washiya, Tokyo (JP); Toshihiro Nitta, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 14/770,488

(22) PCT Filed: Sep. 5, 2013

(86) PCT No.: PCT/JP2013/073918
§ 371 (c)(1),
(2) Date: Aug. 26, 2015

(87) PCT Pub. No.: WO2015/033418
PCT Pub. Date: Mar. 12, 2015

(65) Prior Publication Data
US 2016/0011780 A1    Jan. 14, 2016

(51) Int. Cl.
*G06F 3/06* (2006.01)

(52) U.S. Cl.
CPC ............. *G06F 3/061* (2013.01); *G06F 3/065* (2013.01); *G06F 3/067* (2013.01); *G06F 3/0613* (2013.01);
(Continued)

(58) Field of Classification Search
CPC .... G06F 3/362; G06F 13/4068; G06F 13/409; G06F 13/4282
(Continued)

(56) References Cited

U.S. PATENT DOCUMENTS 6,782,429 B1 * 8/2004 Kisor ............... H04L 12/5692
370/252
6,944,684 B1 * 9/2005 Kinjo ................ G06F 3/0613
710/31
7,124,205 B2 * 10/2006 Craft ..................... G06F 5/10
709/250
(Continued)

FOREIGN PATENT DOCUMENTS

EP    2163996 A1    3/2010
JP    2006-209294 A    8/2006
(Continued)

OTHER PUBLICATIONS

International Search Report and Written Opinion of PCT/JP2013/073918.

*Primary Examiner* — Tim T Vo
*Assistant Examiner* — Phong H Dang
(74) *Attorney, Agent, or Firm* — Mattingly & Malur, PC

(57) ABSTRACT

A storage system includes an expander sequence including a plurality of expanders coupled in series, a plurality of storage devices coupled to the expander sequence, first and second initiator devices coupled to the expander sequence, and a processor. The processor selects an optimal path, with respect to a transmission destination device of a command among the plurality of storage devices and the plurality of expanders, between the optimal path which is an initiator device with fewer expanders in a distance to the transmission destination device and a roundabout path which is an initiator device with more expanders in a distance to the transmission destination device, and transmits the command to the transmission destination device through the selected optimal path.

18 Claims, 23 Drawing Sheets

(52) U.S. Cl.
CPC .......... *G06F 3/0635* (2013.01); *G06F 3/0659* (2013.01); *G06F 3/0683* (2013.01)

(58) Field of Classification Search
USPC .............................................. 710/5, 38, 316
See application file for complete search history.

(56) References Cited

U.S. PATENT DOCUMENTS

| | | |
|---|---|---|
| 8,321,596 B2 | 11/2012 | Johnson et al. |
| 2004/0030799 A1* | 2/2004 | Gulati ............... G06F 15/17343 709/233 |
| 2006/0168394 A1 | 7/2006 | Nakatsuka et al. |
| 2009/0083484 A1* | 3/2009 | Basham ................ G06F 3/0605 711/114 |
| 2009/0259791 A1* | 10/2009 | Mizuno ................ G06F 3/0613 710/316 |
| 2010/0064086 A1 | 3/2010 | McCarty et al. |
| 2012/0036387 A1* | 2/2012 | Nakashima ......... G06F 11/0727 713/340 |
| 2012/0084486 A1 | 4/2012 | Jinno et al. |
| 2013/0205061 A1* | 8/2013 | Jinno ................. G06F 13/4282 710/316 |
| 2014/0244879 A1* | 8/2014 | Myrah ................. G06F 13/409 710/300 |

FOREIGN PATENT DOCUMENTS

| | | |
|---|---|---|
| JP | 2009-258841 A | 11/2009 |
| JP | 2010-61664 A | 3/2010 |
| JP | 2012-73983 A | 4/2012 |

* cited by examiner

Fig. 4

Target management table 201

| | Number of stages N (402) | Expander (403) | Target (404) | Target type (405) | Link rate [Gb/s] (406) | Maximum Link rate [Gb/s] (407) |
|---|---|---|---|---|---|---|
| Controller A | 1 | Expander A | Target A | SAS | 6 | 6 |
| | | | Target D | SAS | 6 | 6 |
| | 2 | Expander B | Target E | SAS | 6 | 6 |
| | | | Target F | SSD | 6 | 6 |
| | 3 | Expander C | Target B | SATA | 6 | 6 |
| | | | Target C | SATA | 6 | 6 |
| Controller B | 1 | Expander C | Target B | SATA | 6 | 6 |
| | | | Target C | SATA | 6 | 6 |
| | 2 | Expander B | Target E | SAS | 6 | 6 |
| | | | Target F | SSD | 6 | 6 |
| | 3 | Expander A | Target A | SAS | 6 | 6 |
| | | | Target D | SAS | 6 | 6 |

Fig. 5A

Access path management table   202

| Target | Optimal path | Roundabout path |
|---|---|---|
| Target A | Controller A | Controller B |
| Target B | Controller B | Controller A |
| Target C | Controller B | Controller A |
| Target D | Controller A | Controller B |
| Target F | Controller A | Controller B |
| Target E | Controller B | Controller A |

Fig. 5B

Access path management table   202

| Target | Optimal path | Roundabout path |
|---|---|---|
| Target F | Controller A | Controller B |
| Target B | Controller B | Controller A |
| Target D | Controller A | Controller B |
| Target E | Controller B | Controller A |
| Target A | Controller A | Controller B |
| Target C | Controller B | Controller A |

Fig. 6

Host I/O management table 203

| | Expander | Target type | Number of I/O | Average response time [ms] | Link rate [Gb/s] | Number of internal processing commands |
|---|---|---|---|---|---|---|
| | | | 604 | 605 | 606 | 607 |
| Controller A | All Expander | SAS | 1,000 | 8 | 6 | 20 |
| | | SATA | 100 | 15 | 6 | 8 |
| | | SSD | 500 | 2 | 6 | 4 |
| | Expander A | SAS | 600 | 6 | 6 | 15 |
| | | SATA | 0 | - | 6 | 0 |
| | | SSD | 0 | - | 6 | 0 |
| | Expander B | SAS | 400 | 10 | 6 | 5 |
| | | SATA | 0 | - | 6 | 0 |
| | | SSD | 500 | 2 | 6 | 4 |
| | Expander C | SAS | 0 | - | 6 | 0 |
| | | SATA | 100 | 15 | 6 | 8 |
| | | SSD | 0 | - | 6 | 0 |
| Controller B | All Expander | SAS | 300 | 6 | 6 | 8 |
| | | SATA | 1,800 | 20 | 6 | 4 |
| | | SSD | 300 | 3 | 6 | 0 |
| | Expander C | SAS | 0 | - | 6 | 0 |
| | | SATA | 1,800 | 20 | 6 | 4 |
| | | SSD | 0 | - | 6 | 0 |
| | Expander B | SAS | 200 | 5 | 6 | 8 |
| | | SATA | 0 | - | 6 | 0 |
| | | SSD | 300 | 3 | 6 | 0 |
| | Expander A | SAS | 100 | 7 | 6 | 0 |
| | | SATA | 0 | - | 6 | 0 |
| | | SSD | 0 | - | 6 | 0 |

(Column labels: 601, 602, 603, 604, 605, 606, 607)

Fig. 15

Zone permission table 1401

| Destination zone group | Source zone group | | | | | | |
|---|---|---|---|---|---|---|---|
| | 0 | 1 | 2 to 3 | 4 to 7 | 8 | 9 | 10 |
| 0 | 0 | 1 | 0 | 0 | 0 | 0 | 0 |
| 1 | 0 | 1 | 0 | 0 | 1 | 0 | 0 |
| 2 to 3 | 0 | 1 | 0 | 0 | 0 | 0 | 0 |
| 4 to 7 | 0 | 1 | 0 | 0 | 0 | 0 | 0 |
| 8 | 0 | 1 | 0 | 0 | 0 | 0 | 0 |
| 9 | 0 | 1 | 0 | 0 | 0 | 0 | 1 |
| 10 | 0 | 1 | 0 | 0 | 0 | 1 | 0 |

Fig. 19

Zoning table 1901

| Routed SAS address | Phy bitmap | | | | | Zone group number |
|---|---|---|---|---|---|---|
| | 0 | 1 | 2 | 3 | ... | |
| SAS address A | 1 | 1 | 1 | 0 | ... | 8 |
| SAS address B | 1 | 1 | 1 | 0 | ... | 9 |
| SAS address C | 0 | 0 | 0 | 0 | ... | 10 |
| ... | ... | ... | ... | ... | ... | ... |

Fig. 20

Zone permission table  2001

| Destination zone group | Source zone group | | | | | | |
|---|---|---|---|---|---|---|---|
| | 0 | 1 | 2 to 3 | 4 to 7 | 8 | 9 | 10 |
| 0 | 0 | 1 | 0 | 0 | 0 | 0 | 0 |
| 1 | 0 | 1 | 0 | 0 | 0 | 0 | 0 |
| 2 to 3 | 0 | 1 | 0 | 0 | 0 | 0 | 0 |
| 4 to 7 | 0 | 1 | 0 | 0 | 0 | 0 | 0 |
| 8 | 1 | 1 | 0 | 0 | 1 | 0 | 0 |
| 9 | 0 | 1 | 0 | 0 | 0 | 0 | 0 |
| 10 | 0 | 1 | 0 | 0 | 0 | 0 | 0 |
| 11 | 0 | 1 | 0 | 0 | 0 | 0 | 1 |

STORAGE SYSTEM AND STORAGE CONTROL METHOD TO SELECT PATH FOR TRANSMITTING COMMAND VIA SAS EXPANDERS

TECHNICAL FIELD

The present invention generally relates to a storage control, such as a technique to transmit a command to a target device through a plurality of SAS (Serial Attached SCSI) expanders.

BACKGROUND ART

A storage system including a plurality of SAS expanders (hereinafter, referred to as expander) has been known. In this kind of storage system, a storage device is coupled to the expanders, and a command from an initiator device to the storage device passes through the expanders.

This kind of storage system is disclosed, for example, in PTL1. According to PTL1, initiator devices are coupled to both ends of a plurality of expanders coupled in series (for example, see FIG. 10).

CITATION LIST

Patent Literature

[PTL 1] U.S. Pat. No. 8,321,596

SUMMARY OF INVENTION

Technical Problem

When capacity of a storage system is increased, the number of storage devices is increased whereby the number of expanders coupled in series also needs to be increased. Additionally, a storage device having higher response speed is becoming popular. Hereinafter, a plurality of expanders coupled in series is referred to as an "expander sequence" for convenience.

In an expander sequence including a great number of expanders, even when a storage device (SATA (Serial ATA)-HDD (Hard Disk Drive)) having relatively low response speed is connected to an expander in a relatively late stage, an impact on a command issuer side (for example, microprocessor which issues command) is small. This is because latency based on the number of expanders, through which a command to the storage device passes, has smaller impact than the response speed of such a storage device. That is, even if the storage device having relatively low response speed is connected to an expander in a relatively early stage or an expander in a relatively late stage, response time for the command issuer side is response time based on the response speed of the storage device.

However, in the expander sequence including a great number of expanders, when a storage device (for example, SSD (Solid State Drive)) having relatively high response speed is coupled to an expander in a relatively late stage, an impact on the command issuer side is significant. Specifically, to the command issuer side, performance of the storage device seems deteriorated. This is because latency based on the number of expanders, through which a command to the storage device passes, has greater impact than the response speed of such a storage device.

Solution to Problem

A storage system includes an expander sequence including a plurality of expanders coupled in series, a plurality of storage devices coupled to the expander sequence, first and second initiator devices coupled to the expander sequence, and a processor. The processor selects an optimal path, with respect to a transmission destination device of a command among the plurality of storage devices and the plurality of expanders, between an optimal path which is an initiator device with fewer expanders in a distance to the transmission destination device and a roundabout path which is an initiator device with more expanders in a distance to the transmission destination device, and transmits the command to the transmission destination device through the selected optimal path.

Advantageous Effects of Invention

Latency based on the length of an expander sequence can be reduced.

BRIEF DESCRIPTION OF DRAWINGS

FIG. 4 is a table illustrating a configuration of a target management table according to the first embodiment.

FIG. 5A is a table illustrating a configuration of an access path management table according to the first embodiment.

FIG. 5B is a table illustrating a result of sorting records of the table illustrated in FIG. 5A in order of response speed of target devices.

FIG. 6 is a table illustrating a configuration of a host I/O management table according to the first embodiment.

FIG. 15 is a table illustrating a configuration of a zone permission table according to the second embodiment.

FIG. 19 is a table illustrating a configuration of a zoning table according to the third embodiment.

FIG. 20 is a table illustrating a configuration of a zone permission table according to the third embodiment.

DESCRIPTION OF EMBODIMENTS

Figure 1:
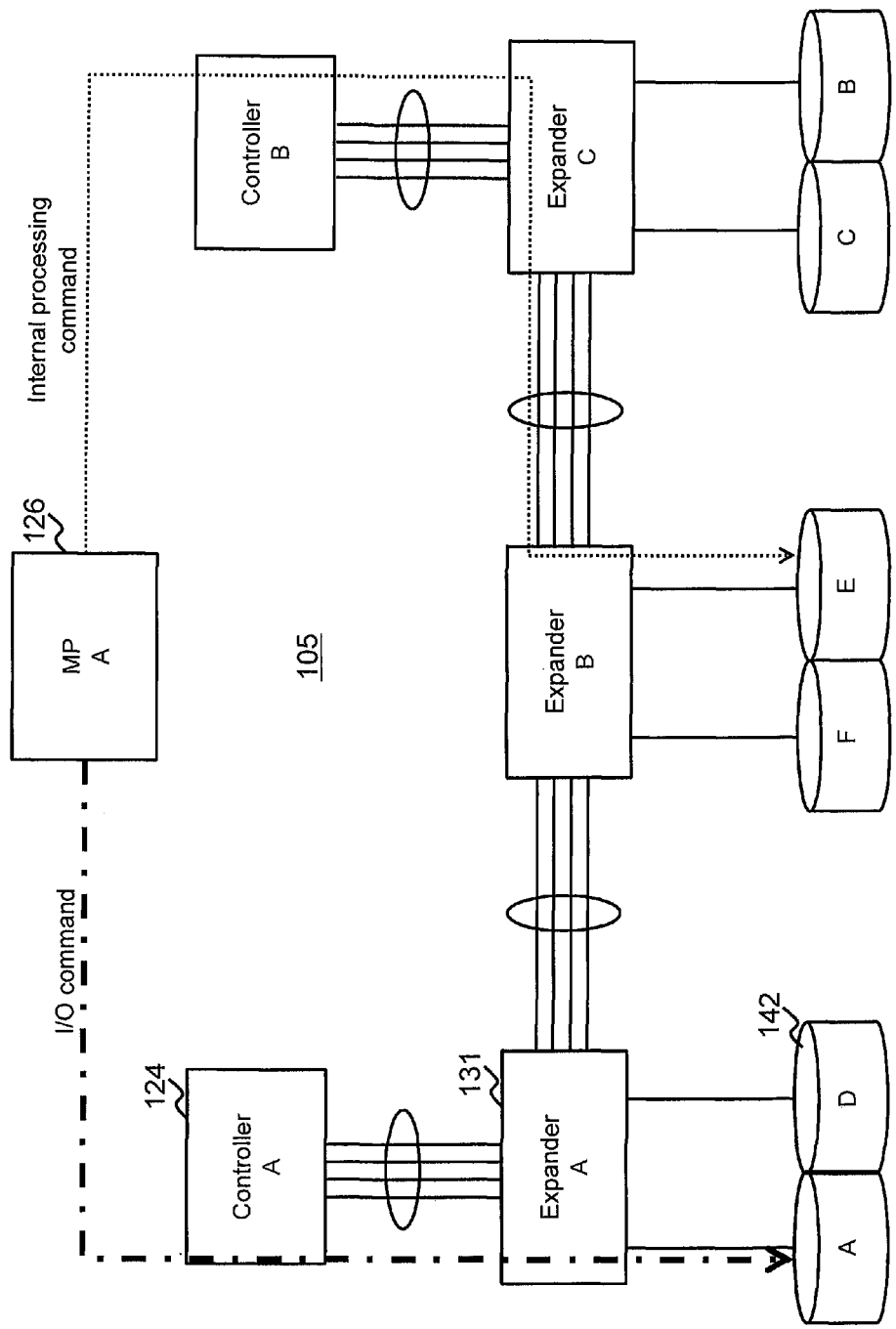
FIG. 1 is a view illustrating an outline of a first embodiment.

In the following, several embodiments will be described.

In the following descriptions, information may be expressed as "xxx table", but the information may be expressed in any kind of data structure. That is, "xxx table" can be referred to as "xxx information" in order to show that the information does not depend on the data structure.

In the following descriptions, a set of one or more computers, which manage a storage system and display information to be displayed, is referred to as a "management system". For example, the management system may be a management computer to display information to be displayed, or may be a combination of a management computer and a display computer that displays information to be displayed. The information to be displayed is transmitted from the management computer. "To display information to be displayed" performed by the management computer may be to display the information to be displayed on a display device included in the management computer or to transmit the information to be displayed to a distant display computer (such as client) by the management computer (such as server). Also, a plurality of computers may perform processing similar to that of the management computer in order to improve the speed and reliability of management processing. In this case, the plurality of computers (including a display computer when the display computer performs displaying) may be the management system.

Also, in the following descriptions, when similar elements are described while being distinguished from each other, identifiers (such as alphabetical letters) assigned to the elements may be used instead of reference signs of the elements. For example, when storage devices are described without being distinguished, the storage devices are described as storage devices 142. When the storage devices are described while being distinguished from each other, the storage devices may be described as a storage device A, a storage device B, and so on.

Also, meanings of terms used in the following descriptions are as follows.

The term "expander" is an abbreviation of an SAS expander. An expander is a kind of switch device and includes a plurality of phys.

The term "expander sequence" means a plurality of expanders coupled in series.

The term "phy" means a physical port (communication port) included in an expander. One device is coupled to one phy, the device being, for example, a different expander or a storage device.

The term "initiator device" means a device which may become a transmission source of a command.

The term "target device" means a device which may become a transmission destination of a command. In the present embodiment, a target device is typically a storage device, but an expander may become a target device depending on the kind of a command.

The term "zoning" means a technique to logically separate a physical configuration (such as topology). According to specifications of the SAS, a plurality of zone groups (zone) can be defined. One or more phys can be assigned to one zone group. For example, it is possible to assign one or more phys of one expander to a certain zone group and to assign different phys of the expander to a different zone group.

Specifically, there are "direct coupling" and "indirect coupling" as "coupling" in topology including an initiator device and a target device. The term "direct coupling" means coupling not through an expander, and the term "indirect coupling" means coupling through one or more expanders. Typically, a target device is indirectly coupled to an initiator device, and indirectly or directly coupled to an expander. In the following descriptions, when it is obvious from the drawings or general technical knowledge whether coupling is direct or indirect, the coupling may be simply referred to as "coupling".

First Embodiment

FIG. 1 is a view illustrating an outline of a first embodiment.

A storage system 105 includes an expander sequence, SAS controllers (hereinafter, referred to as controller) A and B respectively coupled to both ends of the expander sequence, and a microprocessor (hereinafter, referred to as MP) 126. Each of the controllers 124 is an example of an initiator device which can transmit a command according to an SAS protocol.

As described above, the expander sequence is a plurality of expanders 131 coupled in series, such as expanders A, B and C coupled in series. The expander A is at one end of the expander sequence and the expander C is at the other end of the expander sequence. The controller A is coupled to the expander A and the controller B is coupled to the expander C.

A plurality of storage devices 142 is coupled to the expander sequence. For example, storage devices A and D are directly coupled to the expander A, storage devices E and F are directly coupled to the expander B, and storage devices B and C are directly coupled to the expander C.

The controller 124 is directly coupled to the expander 131 with a wide link (for example, logical link which is a set of four physical links), and the expanders 131 are directly coupled to one another with the wide link. The storage device 142 is directly coupled to the expander 131 with one link.

The MP 126 is coupled to the controllers A and B. The MP 126 may transmit a command from either the controller A or B. As the commands transmitted to the expander sequence through the controller A or B, there are an I/O (Input/Output) command and an internal processing command. The I/O command is a write command or a read command to the storage device 142. The internal processing command is a control command to either the storage device 142 or the expander 131. As the internal processing command, for example, there are a health check command to check whether there is an error such as link-down, and a command to control the number of rotations of a fan coupled to the expander 131. Normally, an internal control command is smaller than data transmitted and received according to the I/O command.

As paths to a target device, there are a path including the controller A as an initiator device (hereinafter, referred to as path A) and a path including the controller B as an initiator device (hereinafter, referred to as path B). The MP 126 manages an optimal path and a roundabout path for each of the target devices. The "optimal path" is typically a short-distance path, that is, a path including fewer intervenient expanders between an initiator device and a target device. On the other hand, the "roundabout path" is typically a long-distance path, that is, a path including more intervenient expanders between the initiator device and the target device. Note that, depending on a target device, there may be a case where the number of intervenient expanders between an initiator device and a target device in the roundabout path is the same as that in the optimal path. According to an example of FIG. 1, for the storage device A, the path A is the optimal path (that is, the controller A is the initiator device in the optimal path) and the path B is the roundabout path (that is, the controller B is the initiator device in the roundabout path). Also, according to the example of FIG. 1, whichever path may be selected between the paths A and B, as the optimal path for each of the storage devices E and F. Here, the path B is selected as the optimal path for the storage device E, and the path A is selected as the optimal path for the storage device F.

The MP 126 selects an optimal path corresponding to a target device (storage device) of a command (especially, I/O command) in preference to a roundabout path of the target device, and transmits the command through the selected optimal path. According to the example of FIG. 1, when the storage device A is a target device of an I/O command, the I/O command is transmitted through the path A (see dashed-dotted arrow in FIG. 1). Although not illustrated in FIG. 1, when the storage device B is a target device of an I/O command, the I/O command is transmitted through the path B.

In this manner, initiator devices are respectively coupled to both ends of an expander sequence. Also, for each target device, an optimal path (initiator device) having a shorter distance (number of intervenient expanders) to the target device is selected and a command is transmitted through the optimal path. Thus, impact caused by the length of the expander sequence (number of stages of expanders) is reduced substantially to a half. As a result, the latency caused by the length of the expander sequence can be reduced.

In addition, with respect to an internal processing command, the MP 126 transmits the internal processing command not to interfere with processing of an I/O command (transmitting an I/O command and receiving a response to the I/O command). For example, when load in transmitting an I/O command is higher in the path A than in the path B (for example, when the number of I/O commands transmitted through the path A is greater than that through the path B), the MP 126 transmits an internal processing command to a target device including the path B as the optimal path through the path B (see dashed arrow in FIG. 1), in preference to an internal processing command to a target device including the path A as the optimal path. Note that with respect to an I/O command, the MP 126 may select an optimal path corresponding to a target device of the I/O command, and with respect to an internal processing command, the MP 126 may select a roundabout path corresponding to a target device of the internal processing command. However, in the present embodiment, with respect to an internal processing command, the MP 126 preferentially selects an optimal path corresponding to a target device of the internal processing command. In this manner, it is expected to avoid the deterioration of performance in processing an I/O command to a target device including, as an optimal path, an initiator device in a roundabout path of a target device of an internal processing command.

In the following, the first embodiment will be described in detail.

Figure 2:
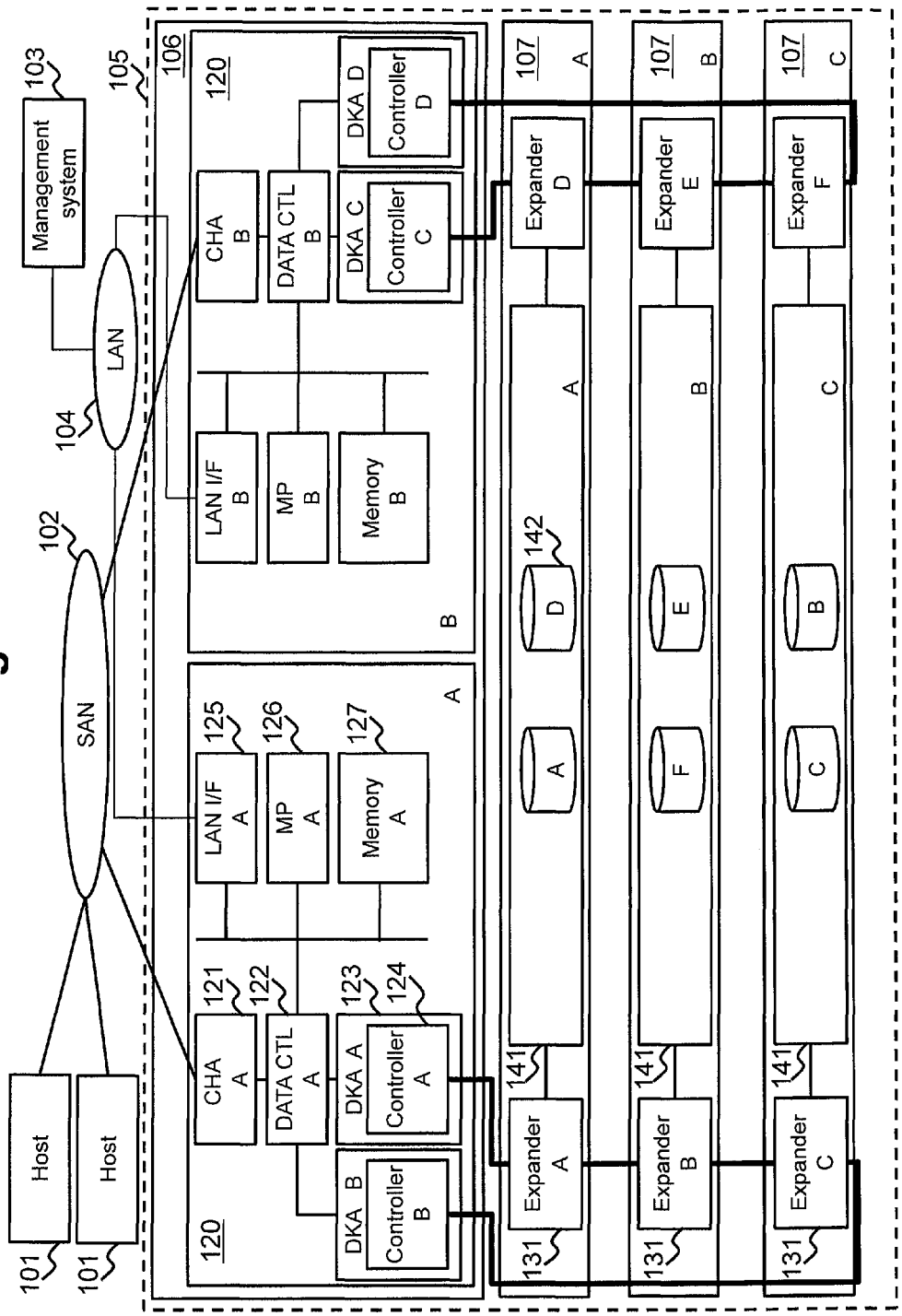
FIG. 2 is a view illustrating a configuration of a computer system according to the first embodiment.

FIG. 2 is a view illustrating a configuration of a computer system according to the first embodiment.

The computer system includes a plurality of (or one) host computers (hereinafter, referred to as host) 101, a storage system 105, and a management system 103. The host 101 and the storage system 105 are coupled to a SAN (Storage Area Network) 102. The management system 103 and the storage system 105 are coupled to a LAN (Local Area Network) 104. Instead of the SAN 102 and the LAN 104, different kinds of communication networks may be employed. Also, the host 101, the management system 103, and the storage system 105 may be coupled to the same communication network.

The host 101 transmits an I/O request of user data to the storage system 105. The user data is used in the host 101. The I/O request includes I/O destination information indicating a place of the I/O destination. The I/O destination information includes, for example, a LUN (Logical Unit Number) of a LU (Logical Unit) in the I/O destination, and a LBA (Logical Block Address) of an area in the LU. The LU is a logical storage device provided by the storage system 105.

The management system 103 is one or more computers to manage the storage system 105. The management system 103 can provide various configurations of the storage system 105.

The storage system 105 includes a storage unit to store data such as user data, and a controller unit to control I/O of data from/to the storage unit. The controller unit includes, for example, a base enclosure 106. The storage unit includes, for example, a plurality of expansion enclosures 107. In the base enclosure 106, duplicated storage controllers 120 (first storage controller A and second storage controller B) are stored. In the expansion enclosure 107, duplicated expanders (first and second expanders) 131 and a storage device group 141 coupled to both of the duplicated expanders 131 are stored. The storage device group 141 is one or more storage devices (physical storage device) 142, and each of the storage devices 142 is coupled to both of the duplicated expanders 131. The plurality of first expanders 131 (expanders A, B and C) respectively included in the plurality of expansion enclosures 107 is coupled in series, whereby a first expander sequence is configured. The plurality of second expanders 131 (expanders D, E and F) respectively included in the plurality of expansion enclosures 107 is coupled in series, whereby a second expander sequence is configured. That is, duplicated expander sequences are configured. Specifically, as paths to a target device with respect to the first expander sequence, as described with reference to FIG. 1, there are the path A including the controller A as an initiator device and the path B including the controller B as an initiator device. As paths to a target device with respect to the second expander sequence, there are a path C including a controller C as an initiator device and a path D including a controller D as an initiator device.

In the following, a configuration of the storage controller 120 will be described with the storage controller A as an example. Note that a communication interface device is abbreviated as "I/F" in the following descriptions.

The storage controller A includes a CHA (Channel Adapter) 121, a data CTL (data controller) 122, a DKA (Disk Adapter) 123, a LAN I/F 125, a MP (microprocessor) 126, and a memory 127.

The CHA 121 is an example of a front-end I/F, and communicates with the host 101 through the SAN 102. The CHA 121 receives an I/O request from the host 101.

The data CTL 122 is a circuit to control data transfer among constituent elements in the storage controller A. For example, the data CTL 122 transfers the I/O request received by the CHA 121 to the MP 126.

The DKA 123 is an example of a back-end I/F, and communicates with the storage device 142 according to an SAN protocol. In the present embodiment, the storage controller A includes the two DKAs 123 which respectively include two controllers (SAS controllers) 124 respectively coupled to both ends of the first expander sequence.

The LAN I/F 125 communicates with the management system 103 through the LAN 104.

The MP 126 processes the I/O request received by the CHA 121. Specifically, for example, the MP 126 specifies one or more storage devices 142 to be I/O destinations of data, based on the I/O destination of the I/O request. Then, the MP 126 transmits an I/O command to each of the specified storage devices 142. The data written into or read from one of the storage devices 142 according to the I/O command may be user data, a piece of user data, or parity. The MP 126 caches the user data into the memory 127, the user data being written into or read from one or more storage devices 142 according to the I/O request.

The memory 127 may be a set of one or more memories, and may include at least one of a volatile memory and a non-volatile memory. The memory 127 includes a cache area of the user data written into or read from one or more storage devices 142. Also, the memory 127 stores a plurality of tables.

The plurality of MPs 126 may exist in one storage controller 120. In this case, at least a part of the memory 127 may be a shared memory area for the plurality of MPs 126. In addition, in this case, the plurality of tables described above may be stored in the shared memory area and referable for each of the MPs 126.

Figure 3:
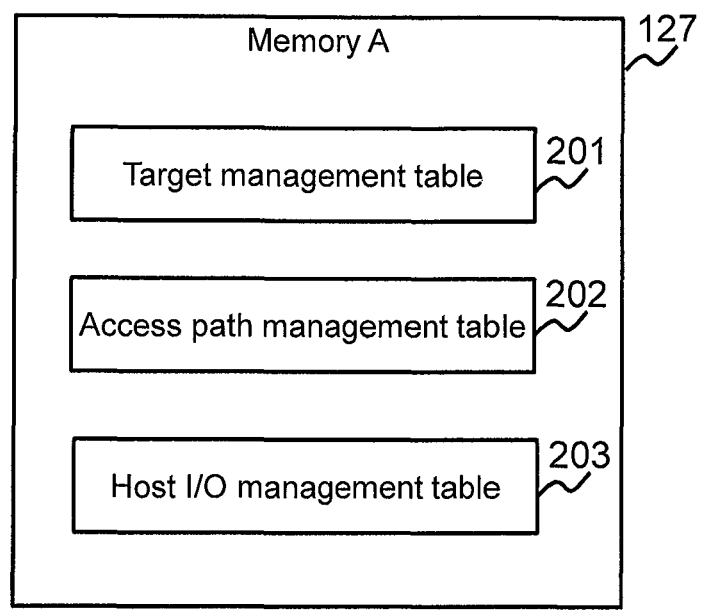
FIG. 3 is a view illustrating a plurality of tables stored in a memory of a storage controller according to the first embodiment.

FIG. 3 is a view illustrating the plurality of tables stored in the memory 127.

The memory 127 stores a target management table 201, an access path management table 202, and a host I/O management table 203. The target management table 201 includes information related to the target devices. The access path management table 202 manages an optimal path and a roundabout path for each of the target devices. The host I/O management table 203 includes information related to load in a path from one end of an expander sequence and load in a path from the other end of the expander sequence.

FIG. 4 is a table illustrating a configuration of the target management table 201.

The target management table 201 includes record groups for each of the controllers 124. One record group includes a record for each of the storage devices. One record includes controller 401, number of stages N 402, expander 403, target 404, target type 405, link rate 406, and maximum link rate 407. The controller 401 is identification information of a controller 124 which has detected a storage device. The number of stages N 402 is information indicating the number of stages of an expander detected by the controller 124. The number of stages of the expander is the number (Nth) counted from the controller 124. The expander 403 is identification information (such as assigned SAS address) of the expander detected by the controller 124. The target 404 is identification information (such as assigned SAS address) of the storage device detected by the controller 124. The target type 405 is information indicating a type of the storage device detected by the controller 124. The link rate 406 is information indicating a link rate (link rate at a time point at which the storage device receives a predetermined command such as a mode sense command and responds thereto) of the storage device. The maximum link rate 407 is information indicating the maximum link rate of the storage device.

According to FIG. 4, for the controller A, the expander A is an expander in the forefront stage and the expander C is an expander in the last stage. Conversely, for the controller B, the expander C is an expander in the forefront stage and the expander A is an expander in the last stage.

Based on the target management table 201, the access path management table 202 and the host I/O management table 203 are created. The target management table 201 may be deleted from the memory 127, after the access path management table 202 and the host I/O management table 203 are created.

FIG. 5A is a table illustrating a configuration of the access path management table 202.

The access path management table 202 includes a record for each of the storage devices. One record includes target 501, optimal path 502, and roundabout path 503. The target 501 is identification information (such as assigned SAS address) of a storage device. The optimal path 502 is identification information (such as assigned SAS address) of a controller (initiator device) closer (including smaller number of intervenient expanders) to the storage device. The roundabout path 503 is identification information of a controller farther (including greater number of intervenient expanders) from the storage device.

For example, as illustrated in FIG. 5B, the records of the access path management table 202 may be sorted in descending order of response speed of the storage devices (target device). Also, at least one of the optimal path 502 and the roundabout path 503 may be omitted for at least one of the target devices. For example, when a controller in the optimal path 502 is specified, the roundabout path 503 is the remaining controller.

FIG. 6 is a table illustrating a configuration of the host I/O management table 203.

The host I/O management table 203 includes record groups for each of the controllers 124. One record group includes sub record groups for each of the expanders. One sub record group includes a record for each storage device type (target type). One record includes controller 601, expander 602, target type 603, number of I/O 604, average response time 605, link rate 606, and number of internal processing commands 607. The controller 601 is identification information (such as assigned SAS address) of a controller 124. The expander 602 is identification information of an expander 131 detected by the controller 124. The target type 603 is information indicating a type of a storage device. The number of I/O 604 is the sum of the number of I/O commands corresponding to storage devices which belong to a storage device type. The average response time 605 is the average of response time corresponding to storage devices which belong to a storage device type. The link rate 406 is the average of the link rate 406 corresponding to storage devices which belong to a storage device type. The number of internal processing commands 407 is the sum of the number of internal processing commands corresponding to storage devices which belong to a storage device type. When an I/O command is transmitted to a storage device through the controller A (B), an MP A updates the number of I/O 604 corresponding to the controller A (B), an expander to which the storage device is directly coupled, and a target type of the storage device. Note that "All Expander" corresponding to the controller A (B) is the result of totaling pieces of information of "Expander A" to "Expander C" corresponding to the controller A (B). Thus, the number of I/O 604 of the "All Expander" corresponding to the controller A (B) is also updated. Similarly, when an internal processing command is transmitted to a storage device through the controller A (B), the MP A updates the number of internal processing commands 607 corresponding to the controller A (B), an expander to which the storage device is directly coupled, and a target type of the storage device (in addition, the number of internal processing commands 607 of the "All Expander" corresponding to the controller A (B) is also updated).

According to FIG. 6, there may be a case where the target type 603 includes "-" as the average response time 605, depending on the expander 602. This means that a storage device which belongs to a type indicated by the target type 603 is not directly coupled to an expander specified by the expander 602. For example, an SAS-HDD is coupled to the expander A, but neither an SATA-HDD nor an SSD is directly coupled thereto. This is obvious also from the target management table 201 (see FIG. 4) on which this table 203 is based.

Also, according to FIG. 6, with respect to two SAS-HDDs (storage devices A and D) which are targets through the controller A and are coupled to the expander A, it can be understood that there are 600 I/O commands in total (number of I/O 604 "600"), the average response time is 6 ms (average response time 605 "6"), the average link rate is 6 Gb/s (link rate 606 "6"), and there are 15 internal processing commands in total (number of internal processing commands 607 "15"). In addition, according to FIG. 6, with respect to two SAS-HDDs (storage devices A and D) which are targets through the controller B and are coupled to the expander A, it can be understood that there are 100 I/O commands in total (number of I/O 604 "100"), the average response time is 7 ms (average response time 605 "7"), the average link rate is 6 Gb/s (link rate 606 "6"), and there is no internal processing command (number of internal processing command 607 "0").

Note that according to FIG. 6, there is "All Expander" as the expander 602 for each of the controllers 123. The "All Expander" is statistics of the pieces of information 604 to 607 corresponding to the expanders A to C. For example, with respect to "SAS" which is the target type 603 corresponding to the "All Expander" in the expander 602 of the controller A, the number of I/O 604 is the sum of the number of I/O 604 of the expanders A to C, the average response time 605 is the average of the average response time 605 of the expanders A and B (average response time 605 of the expander C is "-" whereby it is excluded), the link rate 606 is the average of the link rate 606 of the expanders A to C, and the number of internal processing commands 607 is the sum of the number of internal processing commands 607 of the expanders A to C.

Also, according to FIG. 6, totaling is performed for each target type of each expander, but instead, for each target device of each expander, the number of I/O, the average response time, the link rate, and the number of internal processing commands may be recorded into the host I/O management table 203.

Figure 7:
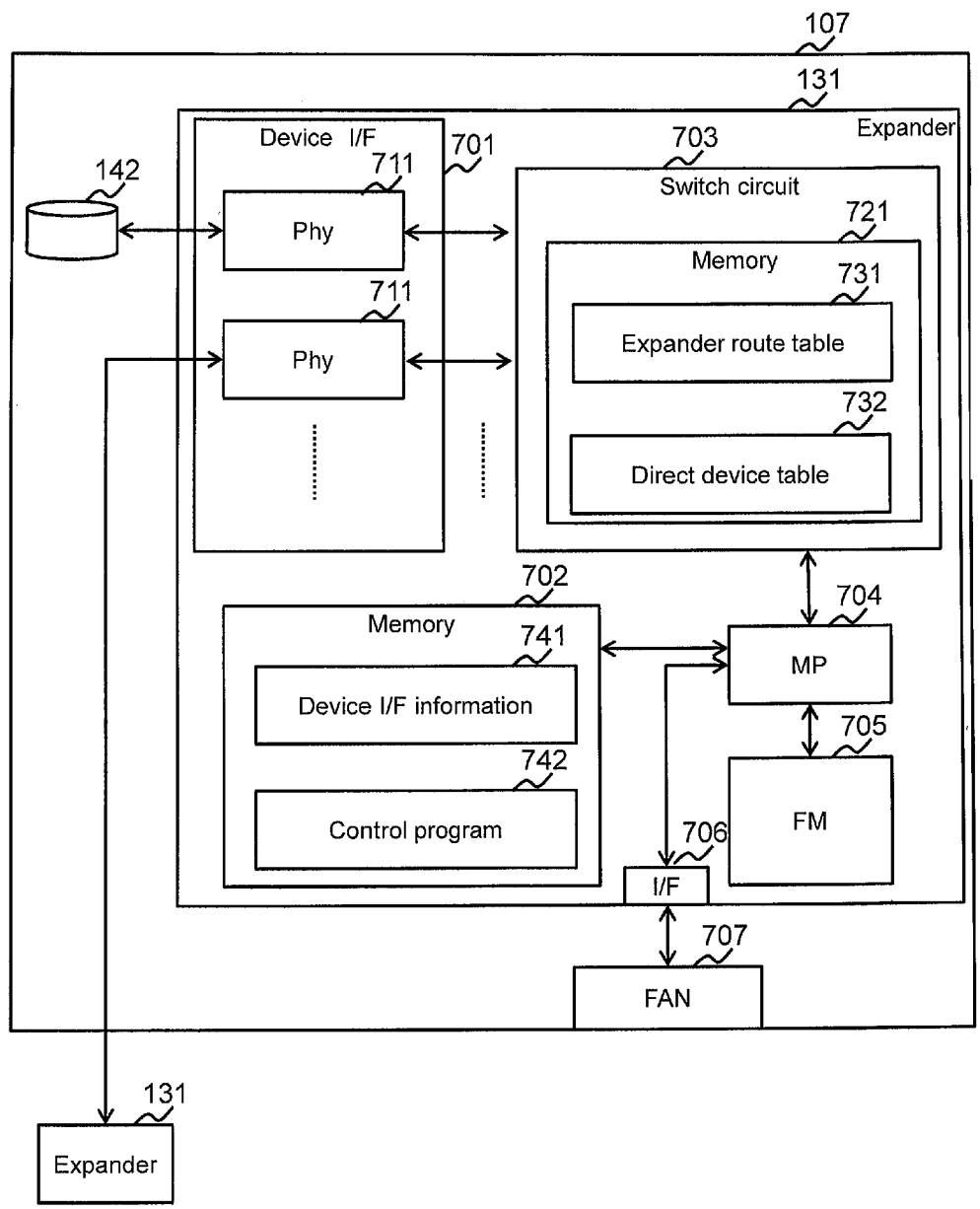
FIG. 7 is a view illustrating a configuration of an expander according to the first embodiment.

FIG. 7 is a view illustrating a configuration of the expander 131.

The expander 131 is, for example, a LSI (Large Scale Integration). The expander 131 includes a device I/F 701, a switch circuit 703, a memory 721, an MP 704, a flash memory (FM) 705, and a fan I/F 706. A fan 707 is stored in the expansion enclosure 107 and coupled to the fan I/F 706.

The device I/F 701 communicates with a device. Here, the "device" means a storage device 142 or a different expander 131. The device I/F 701 includes a plurality of physical ports (Phy) 711. The plurality of phys 711 includes a phy 711 to which the storage device 142 is directly coupled and a phy 711 to which the different expander 131 is directly coupled. When an expander 131 is in the forefront stage, the plurality of phys 711 includes a phy to which a controller 124 is directly coupled.

The switch circuit 703 is a hardware circuit to perform routing. The plurality of Phys 711 and the MP 704 are coupled to the switch circuit 703. The switch circuit 703 includes the memory 721. The memory 721 stores an expander route table 731 and a direct device table 732. Routing is performed based on those tables 731 and 732. A routing table 731 includes, for each phy, identification information (such as assigned SAS address) of a device (expander or storage device) which is accessible through the phy. The direct device table 732 includes correspondence relationship between identification information (such as SAS address) of a directly coupled device and identification information (such as number) of a phy.

The memory 721 stores information and a computer program, such as device I/F information 741 and a control program 742 which is firmware or the like.

The FM 705 is an example of a non-volatile memory to be a saving destination of information and the like stored in a memory 702.

The device I/F information 741 includes status information (such as "Ready" to indicate communication is possible and "Not-ready" to indicate communication is not possible) of each phy 711.

The control program 742 is performed by the MP 704, for example to control validity/invalidity of a phy, to detect status of each phy by polling the phy, to broadcast error information when an error is detected, and to process a command (such as I/O command or internal processing command) according to the command received from the controller 124. For example, when a command is an internal processing command to control the number of rotations of a fan, the control program 742 controls the number of rotations of the fan 707.

In the following, processing performed in the present embodiment will be described. Note that in the following descriptions, the storage controller A and the first expander sequence (expanders A to C) will be described as an example, but similar processing is performed also on the storage controller B and the second expander sequence (expanders D to F). Also, in the following descriptions, identification information of each of the expanders and the storage devices is an SAS address.

Figure 8:
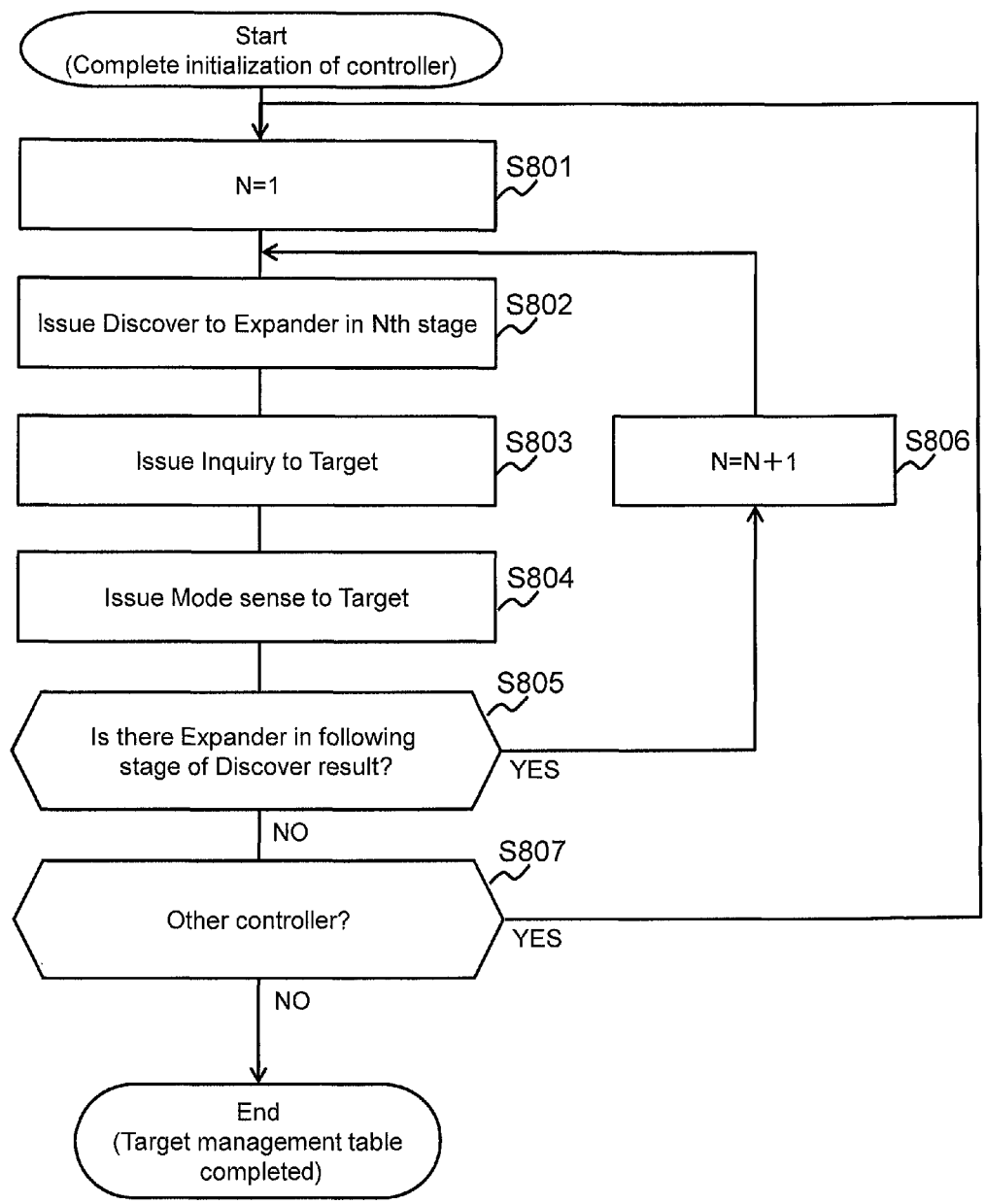
FIG. 8 is a flowchart illustrating a flow of creation processing of the target management table according to the first embodiment.

FIG. 8 is a flowchart illustrating a flow of creation processing of the target management table.

This processing is started when initialization of the controllers A and B is completed. The MP A performs S801 to S805 on one of the controllers A and B, that is, the controller A.

Specifically, the MP A configures N=1 (S801). The variable N is the number of stages of an expander. The variable N is configured in a storage area such as a register or a memory A in the MP A. As described later, the value N is incremented by one. That is, processing in and after S802 is sequentially performed on an expander in the forefront stage of the controller A to the expanders in the following stages. The MP A writes, into the table 201, "controller A" as the controller 401 and "1" as the number of stages N 402. The MP A issues a discovery command to an expander in the Nth stage through the controller A (S802). Then, the MP A receives, from the expander in the Nth stage through the controller A, a response including an SAS address of the expander in the Nth stage and an SAS address of each device (storage device and expander) directly coupled to the expander in the Nth stage. The MP A writes, into the table 201, an expander SAS address (SAS address of expander in Nth stage) as the expander 403 and each target SAS address (SAS address of each target device directly coupled to expander in Nth stage) as the target 404. The MP A issues an inquiry command, which designates the SAS address of the target device, through the controller A to each of the target devices specified by the information (S803). Then, the MP A receives, from each target device directly coupled to the expander in the Nth stage, a response including a type name of each target device through the controller A. The MP A specifies a target type from the received responding type name and writes the specified target type as the target type 405 into the table 201. The MP A issues, through the controller A, a mode sense command to each target device directly coupled to the expander in the Nth stage (S804). Then, the MP A receives, from each target device directly coupled to the expander in the Nth stage, a response including a link rate and the maximum link rate of the target device through the controller A. The MP A writes, into the table 201, the received responding link rate and maximum link rate as the link rate 406 and the maximum link rate 407 respectively. The MP A determines whether there is an expander in the following stage of the expander in the Nth stage, according to the response to the discovery command issued in S802 (S805). When the result of the determination in S805 is true (S805: YES), the MP A configures N=N+1 (S806) and performs the processing in and after S802.

When the result of the determination in S805 is false (S805: NO), the MP A determines whether the processing in and after S801 has been performed on the other controller, that is, the controller B (S807). When the result of the determination in S807 is false (S807: NO), the MP A performs the processing in and after S801 on the controller B. When the result of the determination in S807 is true (S807: YES), the creation processing of the table 201 ends. At this time point, the target management table 201 has been completed.

After the creation processing of the table 201, the access path management table 202 and the host I/O management table 203 are created based on the table 201.

Figure 9:
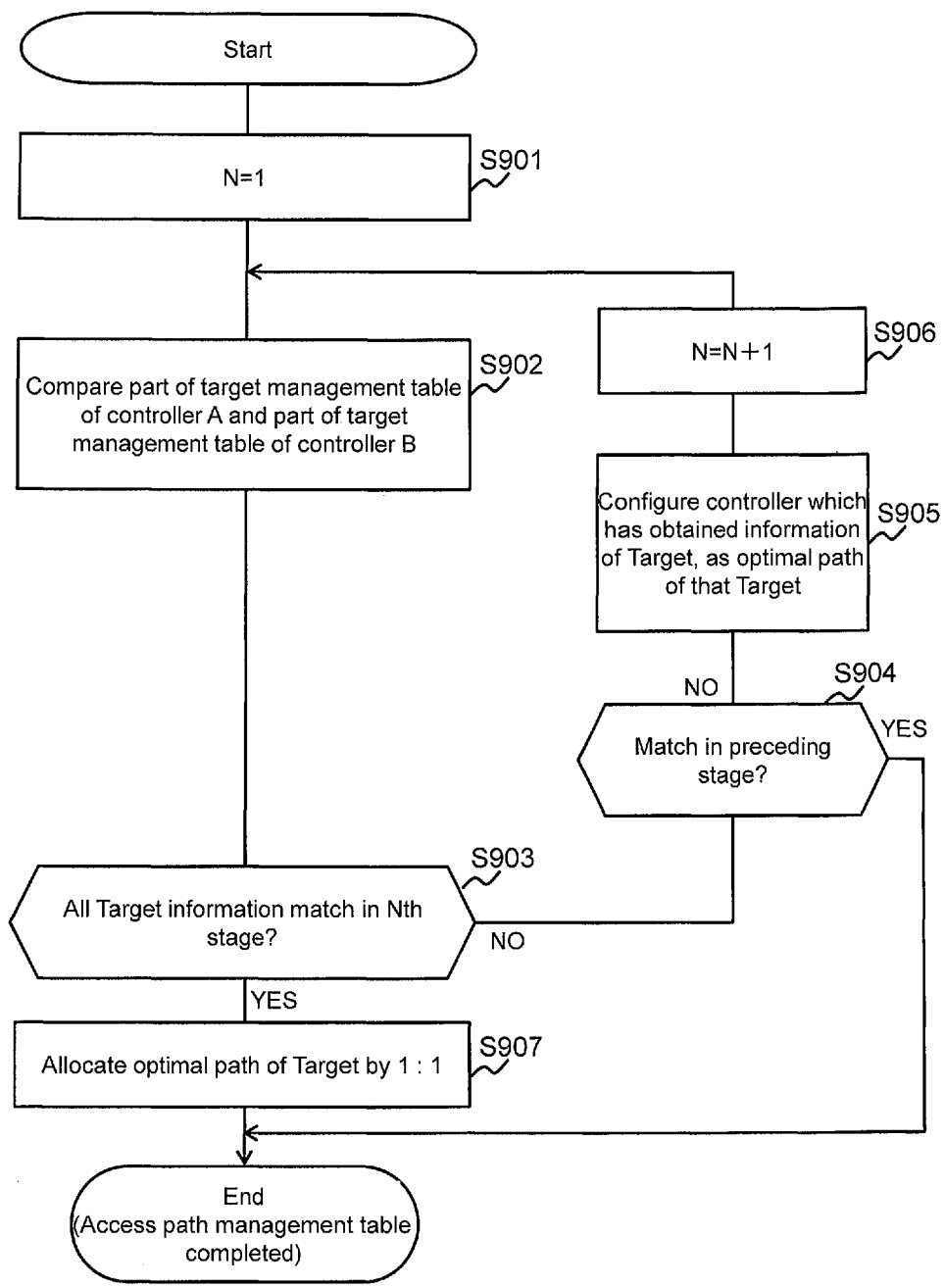
FIG. 9 is a flowchart illustrating a flow of creation processing of the access path management table according to the first embodiment.

FIG. 9 is a flowchart illustrating a flow of creation processing of the access path management table.

The MP A configures N=1 (S901).

Next, the MP A compares sub record groups in the target management table 201, that is, compares a sub record group corresponding to an expander in the Nth stage of the controller A with a sub record group corresponding to an expander in the Nth stage (and preceding stage of Nth stage) of the controller B (S902).

Then the MP A determines whether each of the expander in the Nth stage of the controller A and the expander in the Nth stage of the controller B is an expander in the middle stage of the first expander sequence or an expander in a stage following the middle stage. For example, the MP A determines whether all target SAS addresses of the expander in the Nth stage of the controller A match all target SAS addresses of the expander in the Nth stage of the controller B (S903). When the result of the determination in S903 is false (S903: NO), the MP A determines whether all target SAS addresses of the expander in the Nth stage of the controller A match all target SAS addresses of an expander in a stage preceding the Nth stage of the controller B (S904).

When the result of the determination in S904 is false, for each of the controllers A and B, the expander in the Nth stage is in the stage preceding an expander in the middle stage of the first expander sequence. Thus, when the result of the determination in S904 is false (S904: NO), the MP A writes, into the table 202, the "controller A" as the optimal path 502 and the "controller B" as the roundabout path 503 for each target device directly coupled to the expander in the Nth stage of the controller A. Also, for each target device directly coupled to the expander in the Nth stage of the controller B, the MP A writes the "controller B" as the optimal path 502 and the "controller A" as the roundabout path 503 (S905). Then, the MP A configures N=N+1 (S906) and performs the processing in and after S902.

When the result of the determination in S904 is true, for each of the controllers A and B, the expander in the Nth stage is in the stage following the expander in the middle stage of the first expander sequence. In other words, when the result of the determination in S904 is true, the optimal path has already been configured for all target devices coupled to the first expander sequence. Thus, when the result of the determination in S904 is true (S904: YES), the creation processing ends. This is because the access path management table 202 has already been completed.

When the result of the determination in S903 is true, for each of the controllers A and B, the expander in the Nth stage is the expander in the middle stage of the first expander sequence. Thus, for each target device directly coupled to the expander in the middle stage, the distance to the initiator device (number of intervenient expanders) is the same regardless of whether the initiator device is the controller A or the controller B. Thus, when the result of the determination in S903 is true (S903: YES), the MP A configures the "controller A" as the optimal path 502 and the "controller B" as the roundabout path 503 for a half of the target devices directly coupled to the expander in the Nth stage (expander in middle stage). Also, for the remaining half, the MP A configures the "controller B" as the optimal path 502 and the "controller A" as the roundabout path 503. Note that with respect to the target devices directly coupled to the expander in the middle stage, instead of allocating the "controller A" and the "controller B" as the optimal path 502 simply at 1:1 as described above, the allocation may be determined based on the response speed of the target devices (target type) directly coupled to the expander in the middle stage (and expander in stage preceding middle stage). For example, when the average response speed of target devices of the expanders from the forefront stage of the controller B to the middle stage is higher than the average response speed of target devices of the expanders from the forefront stage of the controller A to the middle stage, with respect to the target devices directly coupled to the expander in the middle stage, the controller B may be configured as the optimal path for more target devices or preferentially for the target devices having relatively low response speed. This is because, in this case, the average response speed from the controller B to the expander in the middle stage is relatively high and occupation time of link is considered to be relatively short.

Figure 10:
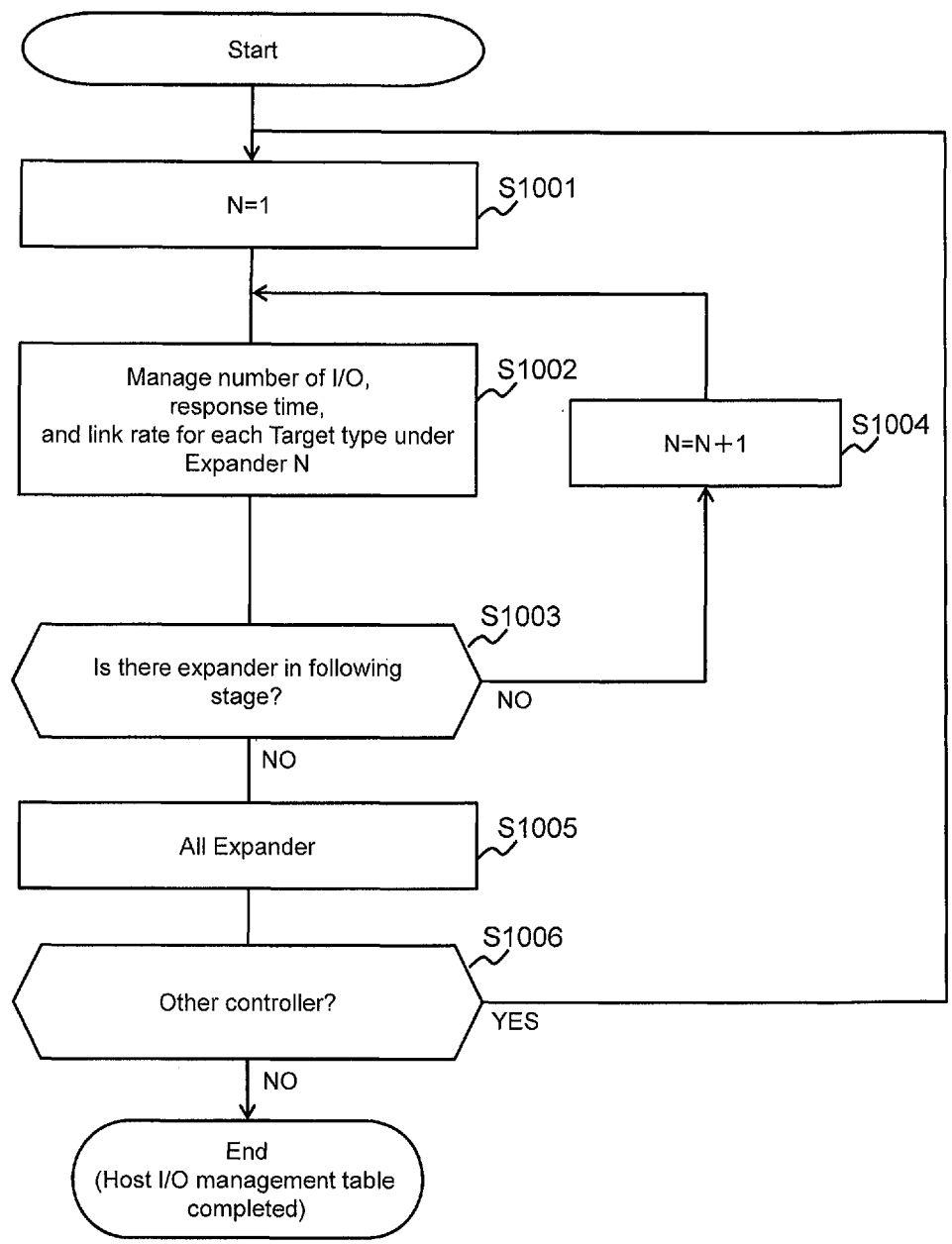
FIG. 10 is a flowchart illustrating a flow of creation processing of the host I/O management table according to the first embodiment.

FIG. 10 is a flowchart illustrating a flow of creation processing of the host I/O management table.

The MP A performs S1001 to S1004 on one of the controllers A and B, that is, the controller A.

Specifically, the MP A configures N=1 (S1001). Then, based on a sub record group, in the target management table 201, corresponding to the expander in the Nth stage, the MP A writes the pieces of information 402 to 407 corresponding to the expander in the Nth stage of the controller A into the table 203 (S1002). Link rate 606 is the average of the link rate 406 of one or more target devices which belong to the same target type. Also, number of I/O 604, average response time 605, and number of internal processing commands 607 are initial values (such as zero) in the initial step and appropriately updated after the storage system 105 becomes online. The MP A determines whether there is an expander in the stage following the expander in the Nth stage (S1003). When the result of the determination in S1003 is true (S1003: YES), the MP A configures N=N+1 (S1004) and performs the processing in and after S1002.

When the result of the determination in S1003 is false (S1003: NO), with respect to the controller A, the MP A adds, into the table 203, a record group of "All Expander" of the expander 602 based on record groups of the expanders A to C (S1005). Then the MP A determines whether the processing in and after S1001 has been performed on the other controller, that is, the controller B (S1006). When the result of the determination in S1006 is false (S1006: NO), the MP A performs the processing in and after S1001 on the controller B. When the result of the determination in S1006 is true (S1006: YES), creation processing of the table 203 ends. At this time point, the host I/O management table 203 is completed.

Figure 11:
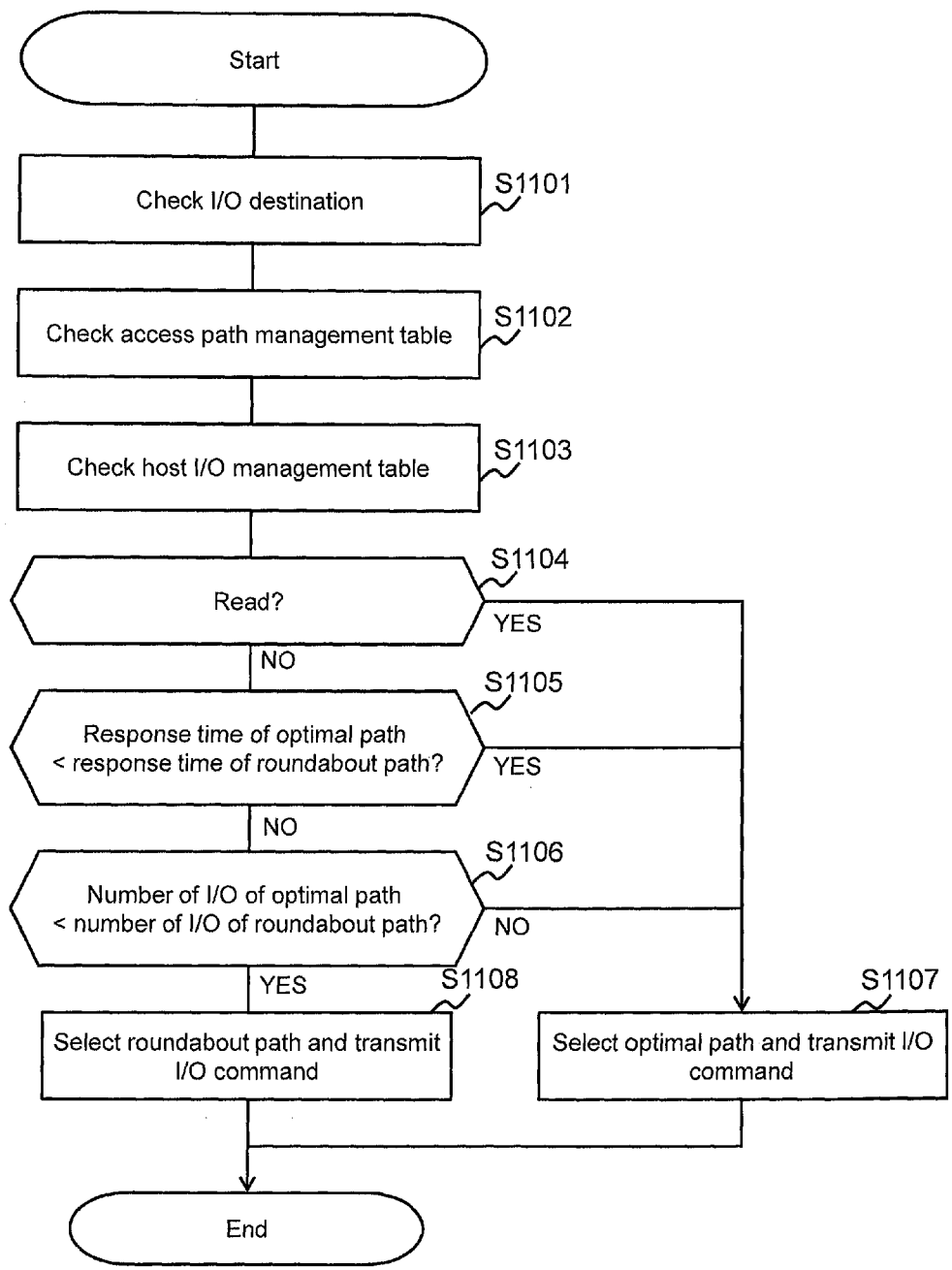
FIG. 11 is a flowchart illustrating a flow of transmission processing of an I/O command according to the first embodiment.

FIG. 11 is a flowchart illustrating a flow of transmission processing of an I/O command.

The MP A checks an I/O destination (S1101). For example, the MP A specifies a target device (storage device in I/O destination) based on an I/O destination LBA designated by an I/O request (I/O request from host 101) on which an I/O command is based.

The MP A checks the access path management table 202 (S1102). For example, the MP A specifies an optimal path (controller) and a roundabout path (controller) corresponding to the target device specified in S1101.

The MP A checks the host I/O management table 203 (S1103). For example, the MP A specifies the number of I/O 604 and the average response time 605 of the optimal path (controller) specified in S1102, and also specifies the number of I/O 604 and the average response time 605 of the roundabout path (controller) specified in S1102. Note that the number of I/O 604 and the average response time 605 of the optimal path are the number of I/O 604 and the average response time 605, which correspond to both of an expander to which a target device is directly coupled and a target type of the target device with respect to the optimal path. The number of I/O 604 and the average response time 605 of the roundabout path are the number of I/O 604 and the average response time 605, which correspond to both of the expander to which the target device is directly coupled and the target type of the target device with respect to the roundabout path. Specifically, when the target device in this case is the storage device A (SAS-HDD), the number of I/O 604 and the average response time 605 of the optimal path are "600" and "6" respectively, both of which correspond to "Controller A", "Expander A" and "SAS". The number of I/O 604 and the average response time 605 of the roundabout path are "100" and "7" respectively, both of which correspond to the "Controller B", the "Expander A" and the "SAS". Note that instead of or in addition to the "Expander A", "All Expander" may be employed.

The MP A determines whether an I/O command is a read command (S1104). When the result of the determination in S1104 is true (S1104: YES), the MP A selects the optimal path specified in S1102 and transmits the I/O command (read command) to a target device through the optimal path (S1107). A read command is transmitted when a read request is received by the MP A from the host 101. A response to the read request (user data of a read object according to read request) is preferably transmitted back to the host 101 in a short period of time. Thus, preferably, a response to the read command is also transmitted back to the MP A from the target device in a short period of time. According to S1104 and S1107, when an I/O command is a read command, the I/O command is transmitted through the optimal path inevitably. Thus, it is expected that a response to the read command is received in a short period of time. Note that S1104 is performed between S1102 and S1103. When S1104 is YES, S1103 may be skipped and S1107 may be performed.

When the result of the determination in S1104 is false (S1104: NO), the MP A determines whether the average response time 605 corresponding to the roundabout path is longer than the average response time 605 corresponding to the optimal path (S1105). The average response time 605 has already been specified in S1103. When the average response time 605 is long, the load is high.

When the result of the determination in S1105 is true (S1105: YES), the MP A selects the optimal path specified in S1102 and transmits the I/O command to the target device through the optimal path (S1107). In this manner, the I/O command is transmitted through the optimal path having the lower load, whereby it is expected that a response to the I/O command can be received in a short period of time.

When the result of the determination in S1105 is false (S1105: NO), the MP A determines whether the number of I/O 604 corresponding to the roundabout path is greater than the number of I/O 604 corresponding to the optimal path (S1106). The number of I/O 604 has already been specified in S1103.

When the result of the determination in S1106 is true (S1106: YES), the MP A selects the roundabout path specified in S1102 and transmits the I/O command to the target device through the roundabout path (S1108). When S1105 is NO and S1106 is YES, the roundabout path has the shorter average response time (lower load) and the greater number of I/O. Thus, the roundabout path is considered to have higher throughput of the I/O command, whereby a response to the I/O command is more likely to be received in a shorter period of time than the optimal path.

When the result of the determination in S1106 is false (S1106: NO), the MP A selects the optimal path specified in S1102 and transmits the I/O command to the target device through the optimal path (S1107). When S1105 is NO and S1106 is NO, the roundabout path has shorter average response time, but most likely, it is simply because the roundabout path has a smaller number of I/O. Thus, a response to the I/O command can be received in a shorter period of time more likely through the optimal path.

What has been described above is a flow of the transmission processing of an I/O command. Note that according to FIG. 11, S1105 is performed before S1106. This means that path determination including average response time as a basis is given priority over path determination including the number of I/O as a basis. In this manner, a path, which makes it possible for a response to an I/O command to be received in a shorter period of time, may be selected more precisely. Also, according to FIG. 11, the path determination including the number of I/O as a basis is performed as adjunctive determination of the path determination including average response time as a basis. Thus, a path, which makes it possible for a response to an I/O command to be received in a shorter period of time, may be selected even more precisely.

Figure 12:
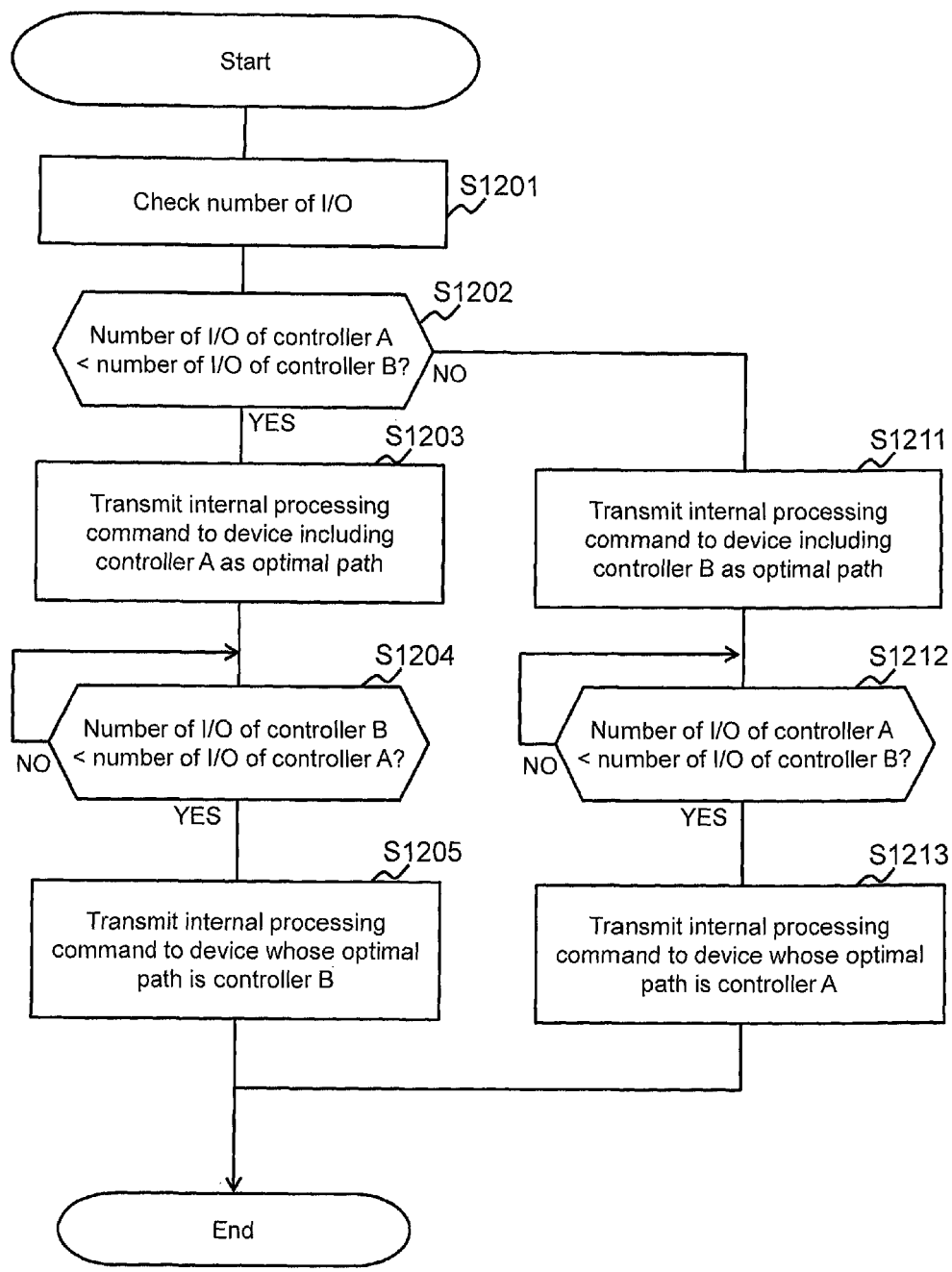
FIG. 12 is a flowchart illustrating a flow of transmission processing of an internal processing command according to the first embodiment

FIG. 12 is a flowchart illustrating a flow of transmission processing of an internal processing command.

The MP A checks the number of I/O (S1201). For example, the MP A specifies, from the host I/O management table 203, the number of I/O of the controller A (total of number of I/O 604 corresponding to "All Expander" of controller A) and the number of I/O of the controller B (total of number of I/O 604 corresponding to "All Expander" of controller B).

The MP A determines whether the number of I/O of the controller B is greater than the number of I/O of the controller A (S1202).

When the result of the determination in S1202 is true (S1202: YES), the MP A transmits, to a device (storage device or expander) including the controller A as the optimal path, an internal processing command to that device until the number of I/O is reversed (until the number of I/O of the controller A becomes greater than the number of I/O of the controller B) (S1203). That is, when the number of I/O of the controller B is greater, an internal processing command to the device including the controller A as the optimal path is processed in preference to an internal processing command to a device including the controller B as the optimal path. In this manner, even when an internal processing command is processed in parallel to the processing of an I/O command, an impact on transmitting an I/O command and receiving a response thereto through the controller B is small.

When the number of I/O of the controller A becomes greater than the number of I/O of the controller B (S1204: YES), the MP A stops S1203 and transmits, to the device (storage device or expander) including the controller B as the optimal path, an internal processing command to that device (S1205).

When the result of the determination in S1202 is false (S1202: NO), the opposite of S1203 to S1205 is performed. That is, the MP A transmits, to the device (storage device or expander) including the controller B as the optimal path, an internal processing command to that device until the number of I/O of the controller B becomes greater than the number of I/O of the controller A (S1211). When the number of I/O of the controller B becomes greater than the number of I/O of the controller A (S1212: YES), the MP A stops S1211 and transmits, to the device (storage device or expander) including the controller A as the optimal path, an internal processing command to that device (S1213).

Second Embodiment

In the following, the second embodiment will be described. In the descriptions, differences between the first embodiment and the second embodiment will be described mainly and similarities therebetween will be omitted or described simply. Also, in the following descriptions, the range of a band of a zone group corresponds, for example, to the number of phys assigned to the zone group. For example, when a band of a zone group is wide, there may be many phys assigned to the zone group, and when a band of a zone group is narrow, there may be a few phys assigned to the zone group.

Figure 13:
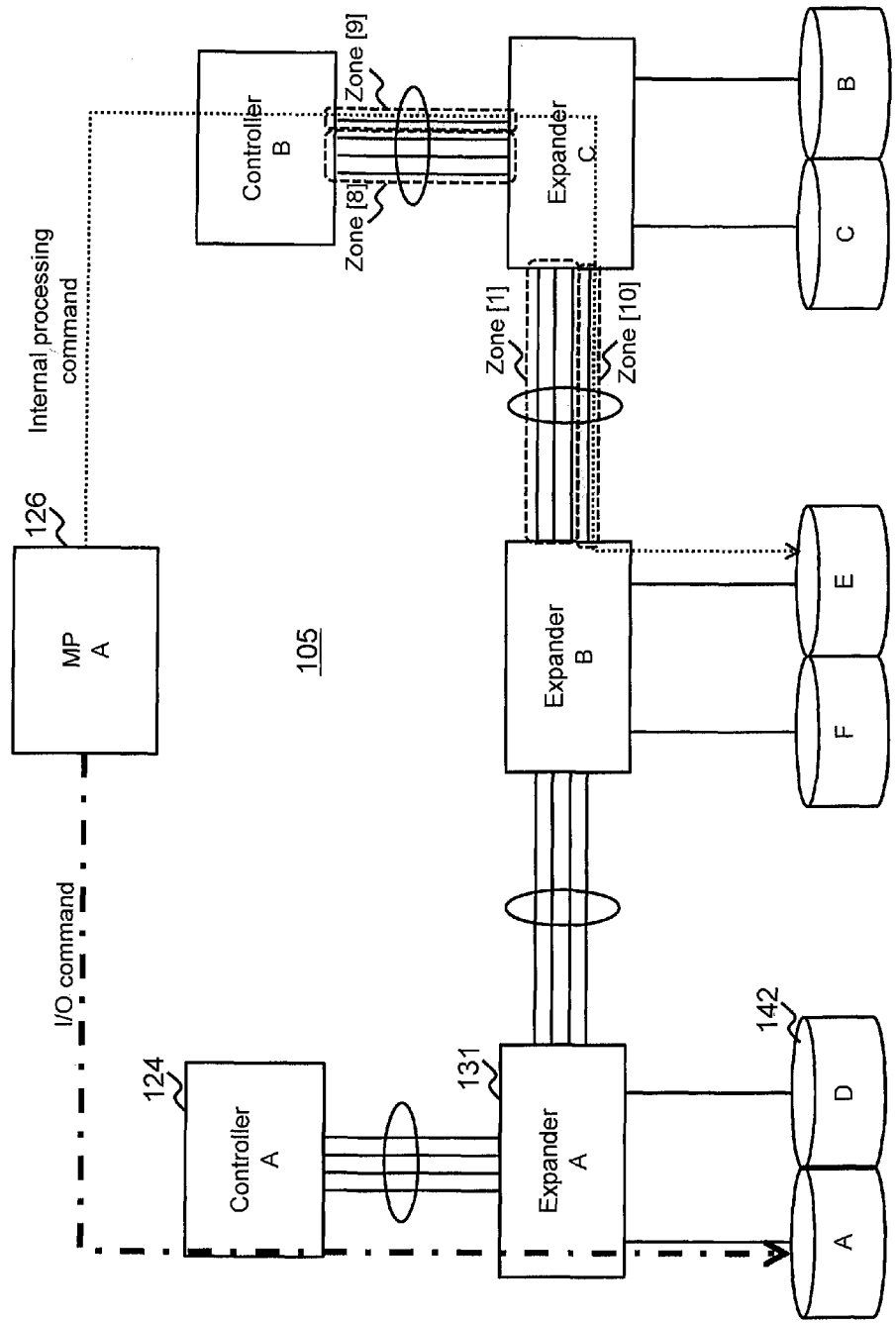
FIG. 13 is a view illustrating an outline of a second embodiment.

FIG. 13 is a view illustrating an outline of the second embodiment.

In the second embodiment, zoning based on specifications of the SAS is used. A plurality of zone groups defined according to the zoning is classified into a zone group for an internal processing command and a zone group for an I/O command. In the following, the zone group for an internal processing command will be referred to as an "internal zone", and the zone group for an I/O command will be referred to as an "I/O zone". The internal zone is used to transmit an internal processing command and to receive a response thereto, but not used to transmit an I/O command or to receive a response thereto. Also, the I/O zone is used to transmit an I/O command and to receive a response thereto, but not used to transmit an internal processing command or to receive a response thereto. The I/O zone and the internal zone are provided between all controllers 124 and all expanders 131 and between all expanders 131. The I/O zones are associated with each other and the internal zones are associated with each other. The I/O zone is not associated with the internal zone, neither is the internal zone associated with the I/O zone. Thus, an I/O command and an internal processing command can reach any of the expanders 131 or any of the storage devices 142 from any of the controllers 124. In this regard, the I/O command passes only through one or more I/O zones and the internal processing command passes only through one or more internal zones.

In an example illustrated in FIG. 13, a wide link to directly couple an expander C to a controller B is separated into an I/O zone "8" and an internal zone "9", and a wide link to directly couple an expander B to an expander C is separated into an I/O zone "1" and an internal zone "10". Then, the I/O zone "8" is associated with the I/O zone "1", and the internal zone "9" is associated with the internal zone "10".

In one wide link, three physical links are assigned to an I/O zone and the remaining one physical link is assigned to an internal zone. The number of physical links assigned to the internal zone may be greater than that of the I/O zone, but considering improving the throughput of an I/O command, the number of physical links assigned to the I/O zone is preferably greater than that of the internal zone. That is, a band of the I/O zone is preferably wider than a band of the internal zone. Between the expanders 131 (and between controller 124 and expander 131), at least one physical link is enough to be assigned to the internal zone. Note that a phy is assigned to one zone group, to be exact. According to the example of FIG. 13, a phy (one phy of controller B) at one end of one physical link and a phy (one phy of expander C) at the other end of the physical link are assigned to the internal zone "9".

When a target of an internal processing command is a storage device E which is directly coupled to the expander B and includes the controller B as the optimal path, an MP A designates the internal zone "9" and transmits, to the controller B, the internal processing command which designates an SAS address of the storage device E. The controller B specifies a phy assigned to the zone group "9" and transmits the internal processing command through the phy. The expander C receives the internal processing command and specifies a zone group "10" associated with the zone group "9" to which the phy having received the internal processing command is assigned. Then the expander C transmits the internal processing command through a phy assigned to the zone group "10". The expander B receives the internal processing command and transmits the internal processing command to the storage device E corresponding to the SAS address designated by the internal processing command.

In the above, the transmission of an internal processing command has been described as an example, but transmission of an I/O command may be performed in a similar manner. For example, when the I/O command is transmitted through the controller B, the MP A may designate the I/O zone "8".

According to the second embodiment, between the expanders 131 (and between controller 124 and expander 131), at least one physical link is secured to transmit an internal processing command and to receive a response thereto. An I/O command or a response thereto does not pass through the physical link secured to transmit an internal processing command and to receive a response thereto. Thus, it is expected that an internal processing command is processed in a short period of time.

Also, according to the second embodiment, between the expanders 131 (and between controller 124 and expander 131), the number of physical links secured to transmit an I/O command and to receive a response thereto is greater than the number of physical links for an internal processing command. An internal processing command or a response thereto does not pass through the physical links secured to transmit an I/O command or to receive a response thereto. Thus, it is expected that an I/O command is processed in a short period of time.

In the following, the second embodiment will be described in detail.

Figure 14:
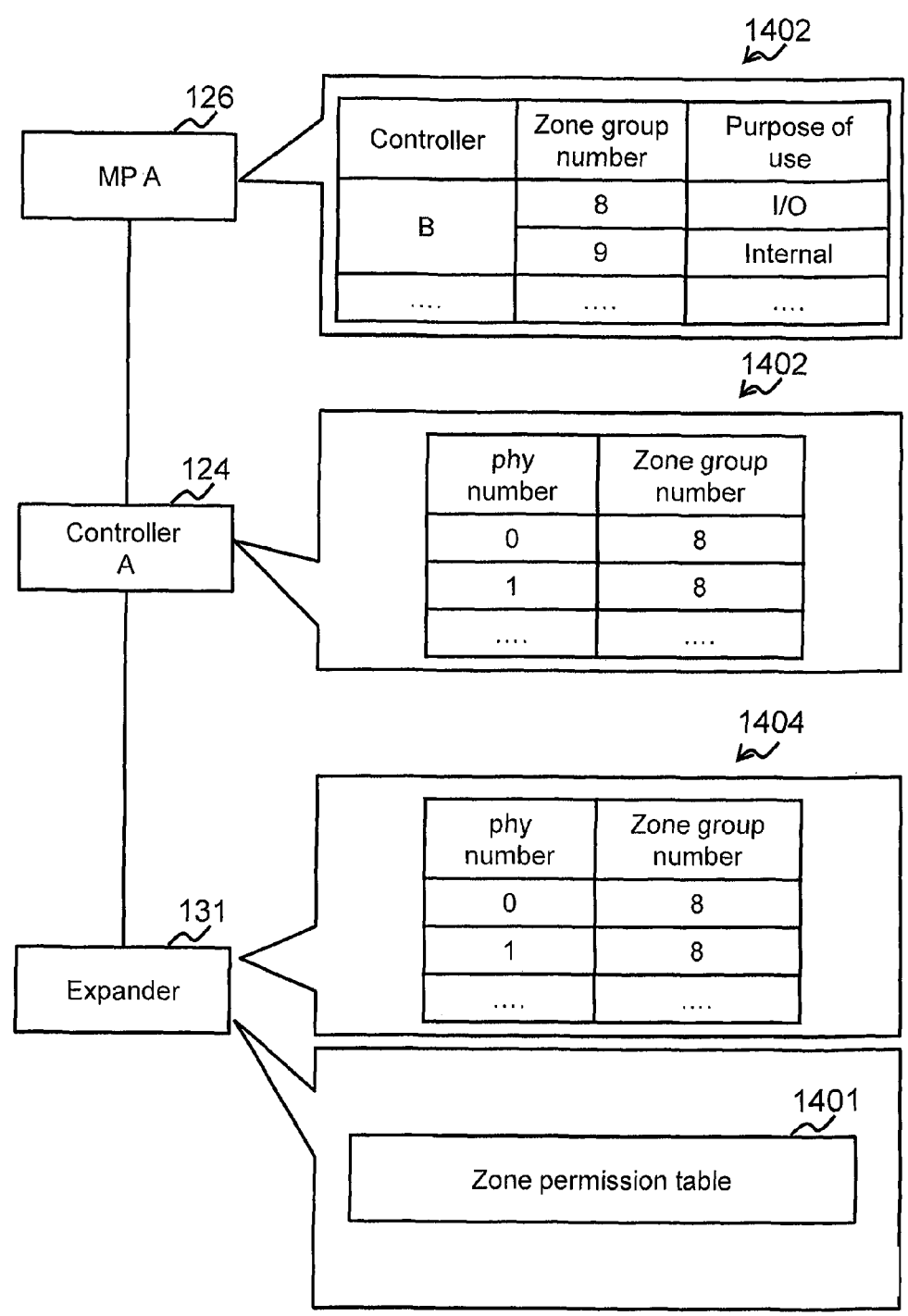
FIG. 14 is a view illustrating an outline of pieces of information which an MP, a controller, and an expander respectively manage, according to the second embodiment.

FIG. 14 is a view illustrating an outline of pieces of information respectively controlled by an MP 126, the controller 124, and the expander 131 according to the second embodiment.

The MP 126 stores a zone management table 1402 in a memory 126. The zone management table 1402 includes, for each controller, a zone group number of an I/O zone and a zone group number of an internal zone. For example, into the table 1402, "8" is recorded as a zone group number of an I/O zone and "9" is recorded as a zone group number of an internal zone with respect to the controller B.

The controllers A and B respectively include phy management tables 1403. The phy management table 1403 includes a zone group number for each phy included in the controller, the phy being assigned to the zone group. According to the example of FIG. 13, when the controller B receives a command which designates the zone group "9", the controller B needs to transmit the command through a phy "3" of the controller B.

In the expander 131 (such as memory 721), a zoning table 1404 and a zone permission table 1401 are further stored. In the zoning table 1404, a zone group number is recorded for each phy included in the expander 131, the phy being assigned to the zone group. The zone permission table 1401 indicates which zone group is associated with which zone group. Information (such as command or response) is not transferred between zones which are not associated with each other.

Note that the controller A (B) may manage the zone management table. In this case, the controller A (B) determines whether a command is an I/O command or an internal processing command. When the command is determined as the internal processing command, the controller A (B) may transmit the internal processing command through an internal zone (through phy assigned to internal zone).

FIG. 15 is a table illustrating a configuration of the zone permission table 1401.

The zone permission table 1401 indicates correspondence relationship between a source zone group and a destination zone group, and "1" means that the groups are associated with each other and "0" means that the groups are not associated with each other. According to FIG. 15, transfer from the zone group "9" to the zone group "10" and transfer from the zone group "10" to the zone group "9" are permitted. Thus, as illustrated in FIG. 13, an internal processing command may be transmitted from the zone group "9" to the zone group "10", and a response thereto may be transmitted from the zone group "10" to the zone group "9".

Figure 16:
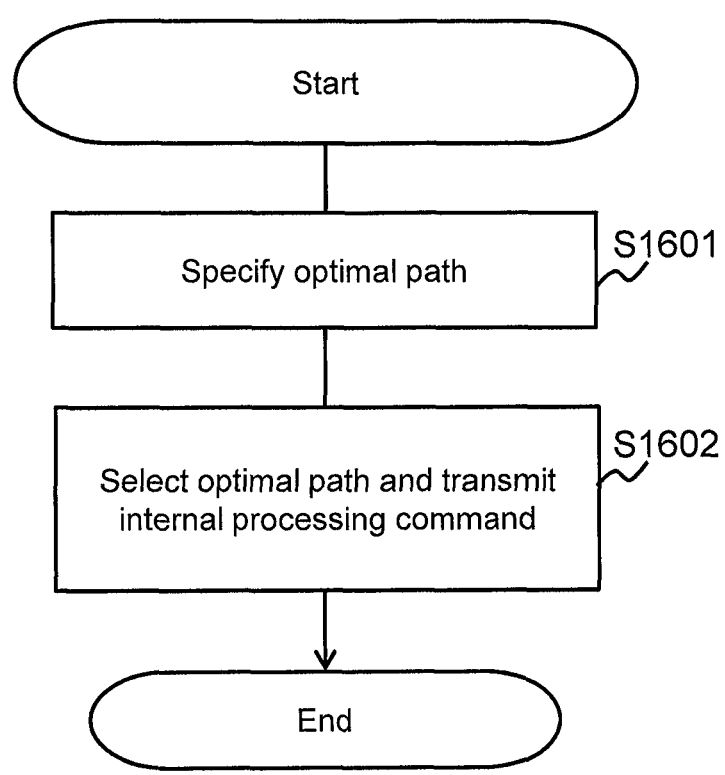
FIG. 16 is a flowchart illustrating a flow of transmission processing of an internal processing command according to the second embodiment.

FIG. 16 is a flowchart illustrating a flow of transmission processing of an internal processing command according to the second embodiment.

The MP A specifies the optimal path of a device which is a target of an internal processing command (S1601). For example, when the device is a storage device, the optimal path of the device is specified from the access path management table 202. Also, for example, when the device is an expander, the optimal path of the device is specified from the host I/O management table 203. A controller in the optimal path is a controller having a shorter distance (smaller number of intervenient expanders) to the device (expander).

The MP A specifies a zone group number of an internal zone of the specified optimal path (controller) from the zone management table 1402, and transmits, to the specified optimal path (controller), an internal processing command which designates the specified zone group number (S1602).

Thus, the internal processing command is transferred to a target of the internal processing command, based on the phy management table 1403 of the optimal path (controller), and the zoning table 1404 and the zone permission table 1401 of the expander.

Incidentally, in the second embodiment, as a general processing flow of configuring information of the storage system 105, the following may be employed. In the following, a case of online and a case of offline will be described. Note that the "case of online" is a case where the storage system 105 is running and is capable of receiving an I/O request from the host 105. The "case of offline" is a case where the storage system 105 is not running and is not capable of receiving an I/O request from the host 105 (for example, during power activation or restart).

Figure 17A:
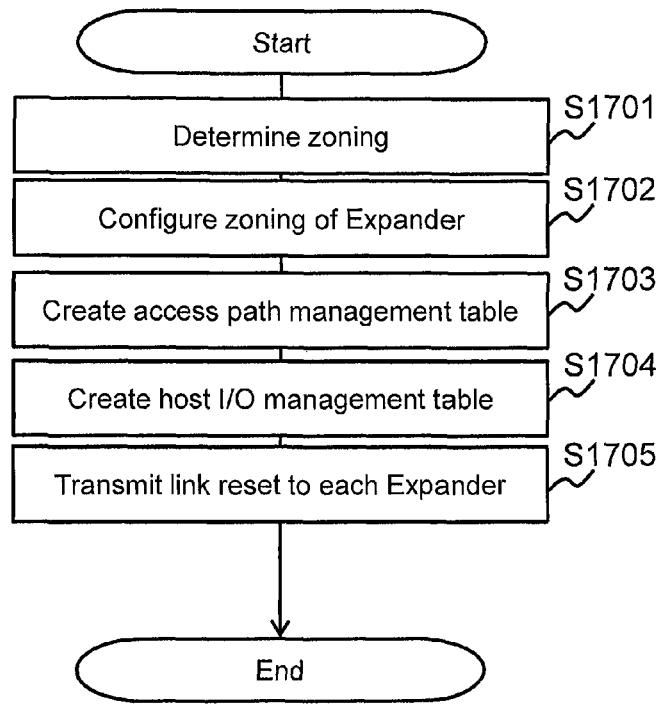
FIG. 17A is a flowchart illustrating a general flow of configuration processing in a case of online according to the second embodiment.

FIG. 17A is a flowchart illustrating a general flow of configuration processing in the case of online.

The MP A determines zoning (S1701). For example, based on the target management table 201, the MP A specifies the number of expanders (number of expanders which configure expander sequence) and a position of a high-speed device (position (SAS address) of expander to which high-speed target device is directly coupled). Here, the "high-speed target device" means a device of a target type having relatively high response speed among devices of a plurality of target types. In the present embodiment, the high-speed target device is an SSD. The MP A defines a plurality of zone groups based on a position of the high-speed device (mth) relative to the number of expanders (the number N). For example, with respect to the controller A, when the position of the high-speed device is in a stage following the middle stage of the expander sequence, the MP A may determine a band of a zone group from the controller A to the position of the high-speed device, according to how many following stages are there from the middle stage to the position of the high-speed device. In addition, as a definition of the zone group, correspondence relationship between a phy and a zoning group number is also determined for each expander.

Then, the MP A configures the determined zoning (S1702). For example, the MP A transmits, to each expander, a command including information (such as information in zone permission table 1401 and zoning table 1404) related to the determined zone group. An expander which has received the command configures the information designated by the command into the memory 721 or the like.

Next, the MP A creates the access management table 202 and the host I/O management table 203 (S1703 and S1704).

Lastly, the MP A transmits a link reset command to each expander in order to enable the zoning configuration of each expander (S1705).

Figure 17B:
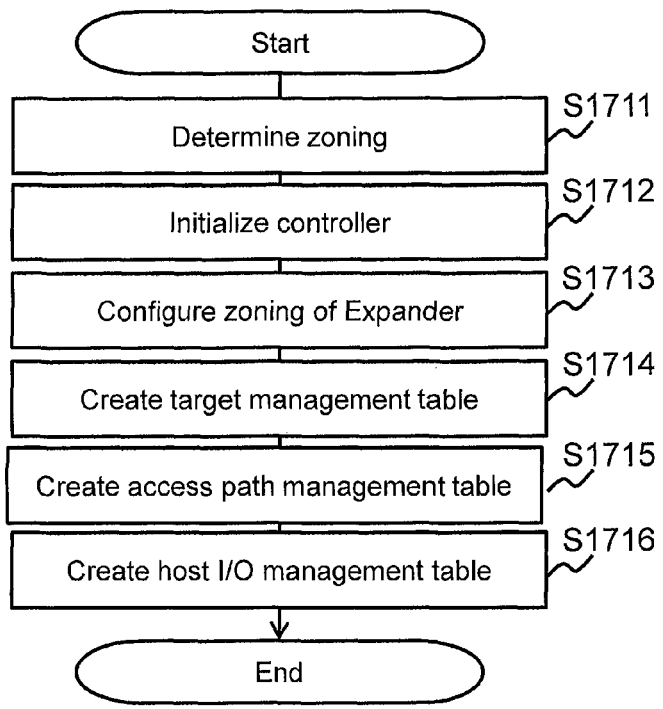
FIG. 17B is a flowchart illustrating a general flow of configuration processing in a case of offline according to the second embodiment.

FIG. 17B is a flowchart illustrating a general flow of configuration processing in the case of offline.

The MP A determines zoning (S1711). Specifically, the MP A receives, from the management system 103, configuration information indicating a configuration similar to the configuration indicated in the target management table 201 and determines the zoning based on the configuration information in a manner similar to S1701.

The MP A initializes the controllers A and B (S1712).

The MP A configures, for each expander, the zoning (definition of zone group) determined in S1711 (S1713). Specifically, according to a response to a discover command to an expander, the MP A specifies an SAS address of the expander. Then, the MP A configures the zoning to the expander by using the SAS address.

Next, the MP A creates the target management table 201 (S1714). Then, the MP A creates the access path management table 202 and the host I/O management table 203 (S1715 and S1716).

In the information configuration in the case of offline, the expander is restarted. Therefore, it is not necessary to transmit a link reset command to the expander, unlike the case of online.

Note that in the first embodiment, a general processing flow illustrated in FIGS. 17A and 17B except the zoning may be employed.

Third Embodiment

In the following, the third embodiment will be described. In the descriptions, differences between the third embodiment and the first and second embodiments will be described mainly, and similarities therebetween will be omitted or described simply.

Figure 18:
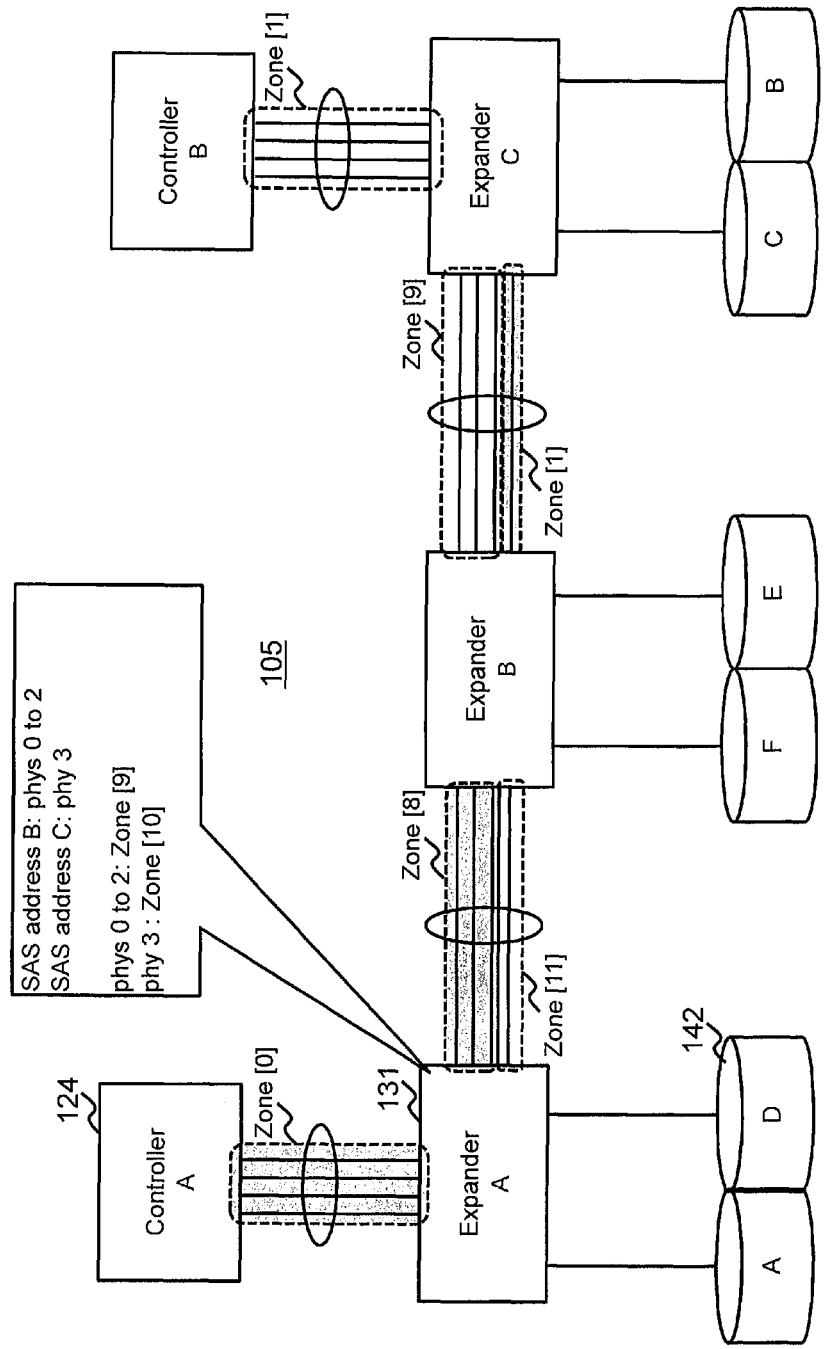
FIG. 18 is a view illustrating an outline of a third embodiment.

FIG. 18 is a view illustrating an outline of the third embodiment.

In the third embodiment, similarly to the second embodiment, zoning based on specifications of the SAS is used. The difference between the third embodiment and the second embodiment is that a zone group is classified into a zone group for a controller A (hereinafter referred to as A zone) and a zone group for a controller B (hereinafter referred to as B zone) instead of being classified into an internal zone and an I/O zone. A band of the A zone far from the controller A is narrower than a band of the A zone close to the controller A. Similarly, a band of the B zone far from the controller B is narrower than a band of the B zone close to the controller B. In other words, since the band of the A zone far from the controller A is narrow, the band of the B zone close to the controller B is kept wide. Also, since the band of the B zone far from the controller B is narrow, the band of the A zone close to the controller A is kept wide. In FIG. 18, the A zone is illustrated in gray and the B zone is illustrated in white. Note that similarly to the second embodiment, any band of the A zone and any band of the B zone may be determined based on the number of expanders (number of expanders which configure expander sequence) and a position of a high-speed device (position of expander to which high-speed target device is directly coupled).

To prevent a command from the controller A from passing through the B zone and prevent a command from the controller B from passing through the A zone, in each expander, a limited phy can access an expander in the following stage (subsequent stage). For example, according to FIG. 18, it is possible to access an expander B through phys 0 to 2 of an expander A, but it is not possible to access the expander B through a phy 3 of the expander A.

According to the spread of an optical cable and the like, a connection distance between the expanders has become longer, whereby an initiator device can be coupled to an expander in the latter stage of an expander sequence. It is considered that the farther an expander is from the initiator device, the fewer commands issued from the initiator device pass through a phy of the expander. According to the third embodiment, as described above, a band of the A zone far from the controller A is narrower than a band of the A zone close to the controller A, and accordingly, a band of the B zone close to the controller B is kept wide. When the controller A is selected as the roundabout path, a band close to a target device is narrow whereby response time of the target device may become long. However, the roundabout path is selected less frequently than the optimal path. On the other hand, a band between a target device and a controller selected as the optimal path of the target device is kept wide, and thus, response time of the target device is short. That is, the response time is more likely to be short. Therefore, throughput of a command is expected to be improved generally.

In the following, the third embodiment will be described in detail.

FIG. 19 is a table illustrating a configuration of a zoning table 1901 according to the third embodiment.

The zoning table 1901 includes a zone group number, a phy bitmap including a phy number assigned to the zone group, and an SAS address of a device (expander). The phy bitmap corresponding to one SAS address indicates, for each phy, whether connection with a device including the SAS address is being performed through the phy (1: in use and 0: not in use). Therefore, according to this table 1901, transfer to the expander B (SAS address B) through the phys 0 to 2 is being performed but transfer to the expander B through the phy 3 is not being performed.

FIG. 20 is a table illustrating a configuration of a zone permission table 2001 according to the third embodiment.

The configuration of the zone permission table 2001 is similar to the configuration of the zone permission table 1401 according to the second embodiment. According to this table 2001, transfer from an A zone "8" to an A zone "10" is not possible, but transfer from the A zone "8" to a B zone "9" is possible.

In the third embodiment, as transmission processing of an internal processing command, the transmission processing of an internal processing command in the first embodiment may be employed. In the third embodiment, when transmitted from the controller A, an internal processing command (and I/O command) passes only through the A zone among the A and B zones, and when transmitted from the controller B, the internal processing command (and I/O command) passes only through the B zone among the A and B zones.

Several embodiments have been described above, but the present invention is not limited to these embodiments and various modifications can be made within the scope of the present invention.

Figure 21:
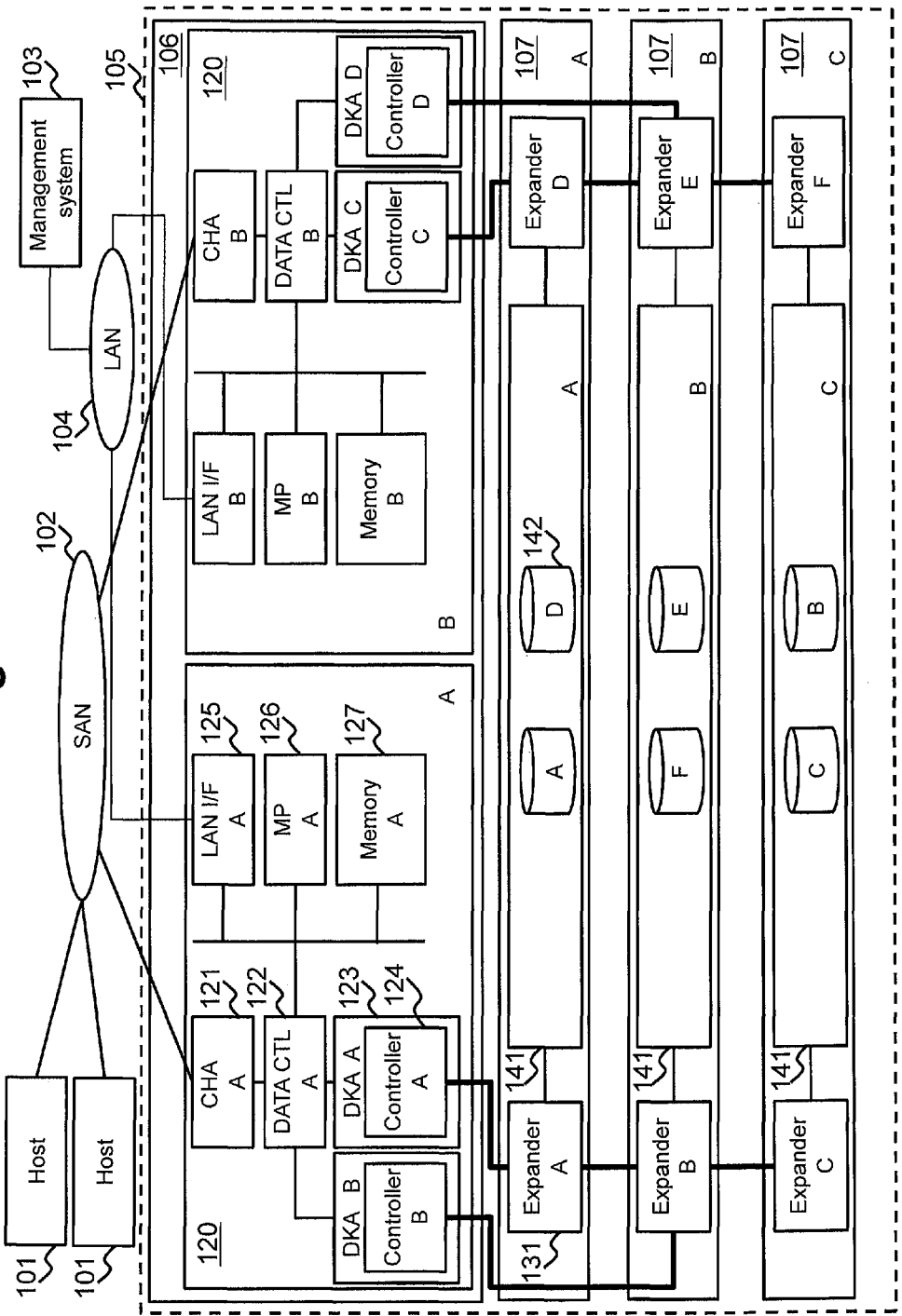
FIG. 21 is a view illustrating a first modification of the configuration of the computer system according to the first embodiment.

For example, with respect to one expander sequence, two initiator devices may not be respectively coupled to both ends of the expander sequence. At least one initiator device may be coupled to an expander in the midway of the expander sequence, an example thereof being illustrated in FIG. 21. According to FIG. 21, the controller B is coupled to the expander B in the midway of the expander sequence. In this configuration, the optimal path of all target devices directly coupled to the expanders B and C is the controller B.

Figure 22:
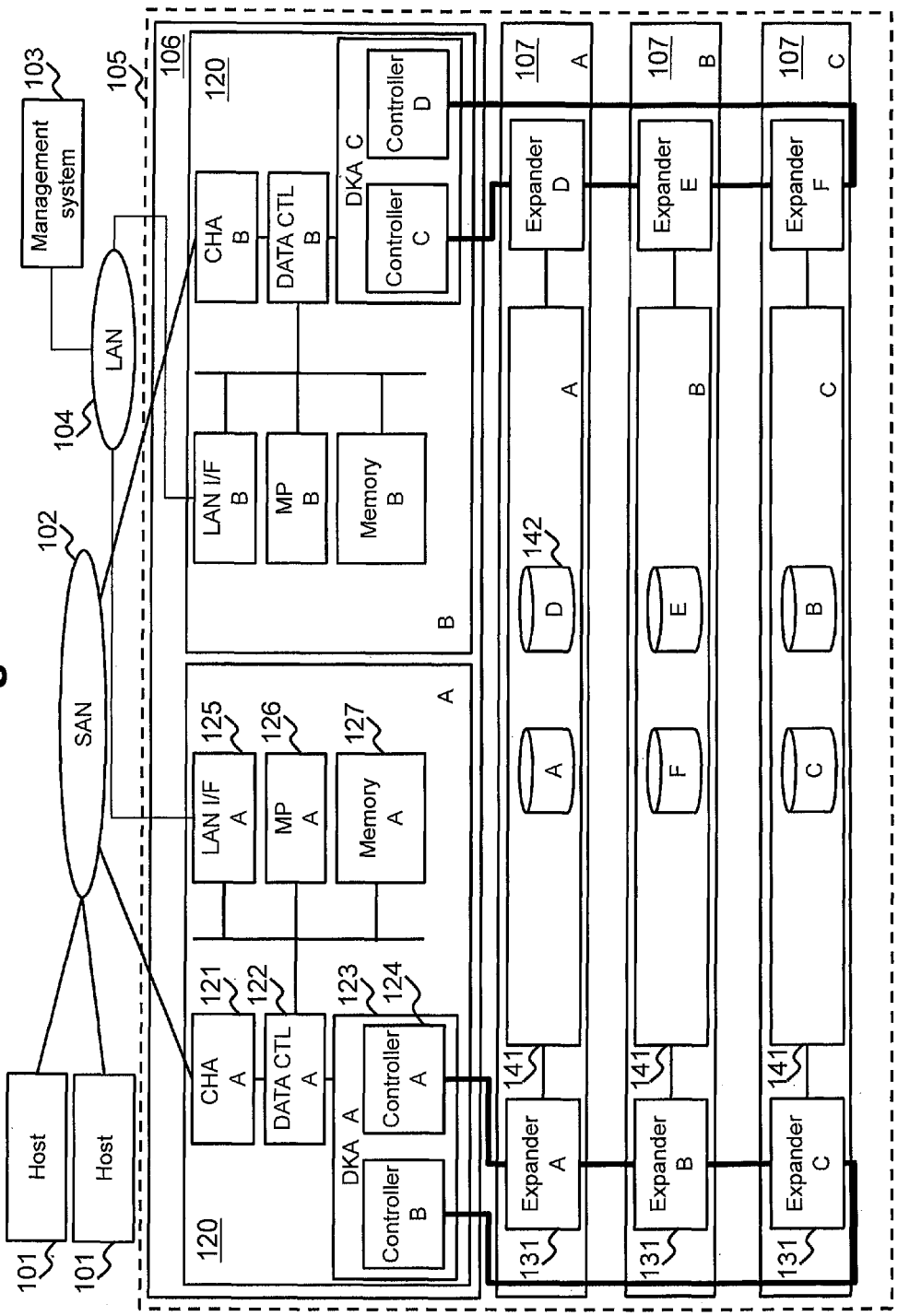
FIG. 22 is a view illustrating a second modification of the configuration of the computer system according to the first embodiment.

Also, for example, as illustrated in FIG. 22, one DKA 123 may include two controllers (initiator devices) 124.

Figure 23:
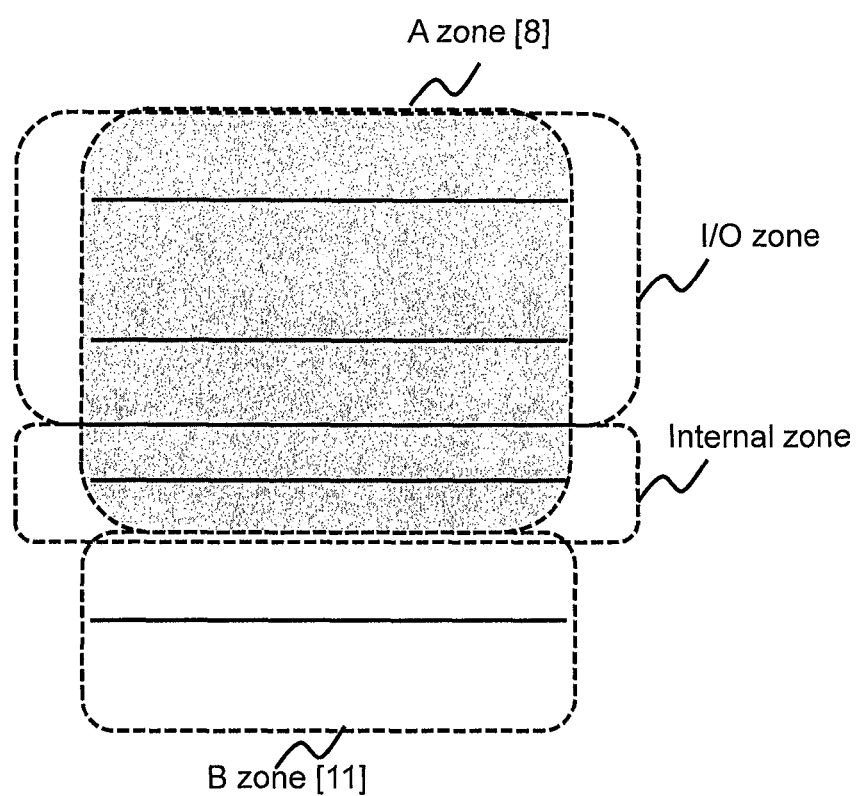
FIG. 23 is a view illustrating an exemplary combination of the second embodiment and the third embodiment.

Moreover, the zoning of the second embodiment and the zoning of the third embodiment may be combined. For example, as illustrated in FIG. 23, the A zone "8" of the third embodiment may include an I/O zone and an internal zone. Also, in this case, at least two physical links may be assigned to each of the A zone and the B zone. One physical link may be assigned to the I/O zone and the remaining one physical link may be assigned to the internal zone.

Furthermore, it may be determined whether to select the optimal path or the roundabout path, based on a link rate of a target device to be an actual transmission destination of a command. Also, path selection based on a link rate and path separation (definition of zone group) according to zoning may be performed separately.

In addition, one expander sequence may include equal to or more than three initiator devices.

REFERENCE SIGNS LIST

124: SAS controller (initiator device)
126: microprocessor
131: SAS expander

The invention claimed is:

1. A storage system comprising:
an expander sequence including a plurality of expanders coupled in series;
a plurality of storage devices directly coupled to the expander sequence;
a first initiator device directly coupled to a first expander which is one of the expanders in the expander sequence;
a second initiator device directly coupled to a second expander which is one of the expanders in the expander sequence and different from the first expander; and
a processor configured to transmit a command through one of the first and second initiator devices to a transmission destination device of the command among the plurality of storage devices and the plurality of expanders,
wherein the processor is configured to select a path, with respect to the transmission destination device, between the optimal path which is an initiator device with fewer expanders in a distance to the transmission destination device and a roundabout path which is an initiator device with more expanders in a distance to the transmission destination device, and to transmit the command to the transmission destination device through the selected path;
wherein the command is an I/O command;
wherein the processor is configured to compare, with respect to the transmission destination device, response time of the optimal path with response time of the roundabout path; and
wherein the processor is configured to compare, with respect to the transmission destination device, the number of I/O commands issued through the optimal path with the number of I/O commands issued through the roundabout path, and to select the optimal path with fewer expanders in the distance to the transmission destination device than the roundabout path, when the number of I/O commands of the optimal path is equal to or greater than the number of I/O commands of the roundabout path with more expanders in the distance to the transmission destination device than the optimal path, without regard to whether the response time of the optimal path is smaller than or equal to or longer than the response time of the roundabout path.

2. The storage system according to claim 1,
wherein the transmission destination device is one of the plurality of storage devices, and
wherein the processor is configured to select the optimal path with fewer expanders in the distance to the transmission destination device than the roundabout path, when the number of I/O commands of the optimal path is equal to or greater than the number of I/O commands of the roundabout path and the response time of the optimal path is shorter than the response time of the roundabout path.

3. The storage system according to claim 1,
wherein the processor is configured to select the roundabout path with more expanders in the distance to the transmission destination device than the optimal path, when the response time of the roundabout path is shorter than the response time of the optimal path and the number of I/O commands of the roundabout path is greater than the number of I/O commands of the optimal path.

4. The storage system according to claim 1,
wherein the processor is configured to select, when the command is a read command, the optimal path with fewer expanders in the distance to the transmission destination device than the roundabout path, without regard to the response time of the optimal path and the response time of the roundabout path with respect to the transmission destination device.

5. The storage system according to claim 1,
wherein the command transmitted by the processor includes an I/O command to input/output data from/to the storage device and an internal processing command which is a control command to cause the expander or the storage device to perform processing different from input/output of data, and
wherein the processor is configured to transmit, through the first initiator device, an internal processing command to a device including the first initiator device as the optimal path, when load of the first initiator device is lower than load of the second initiator device.

6. The storage system according to claim 5,
wherein the load of the first initiator device is the number of I/O commands issued from the first initiator device, and
wherein the load of the second initiator device is the number of I/O commands issued from the second initiator device.

7. The storage system according to claim 5,
wherein the processor is configured to, when the load of the first initiator device becomes equal to or higher than the load of the second initiator device, stop transmitting, through the first initiator device, the internal processing command to the transmission destination device including the first initiator device as the optimal path and to transmit, through the second initiator device, an internal processing command to a device including the second initiator device as the optimal path.

8. The storage system according to claim 1,
wherein the command transmitted by the processor includes an I/O command to input/output data from/to the storage device and an internal processing command which is a control command to cause the expander or the storage device to perform processing different from input/output of data,
wherein the first and second initiator devices and the plurality of expanders respectively include a plurality of physical ports to be assigned to a plurality of zone groups,
wherein the plurality of zone groups includes, with respect to each of the first and second initiator devices, an internal zone which is a zone group through which an internal processing command passes and an I/O command does not pass, and
wherein the internal processing command issued by the processor reaches a transmission destination device of the internal processing command through the physical port assigned to the internal zone.

9. The storage system according to claim 8,
wherein the plurality of zone groups includes, with respect to each of the first and second initiator devices, an I/O zone which is a zone group through which the I/O command passes and the internal processing command does not pass,
wherein a band of the internal zone is narrower than a band of the I/O zone with respect to a distance between the same expanders, and
wherein a band of a zone group corresponds to a number of physical ports assigned to the zone group and a wider band has more physical ports than a narrower band.

10. The storage system according to claim 1,
wherein the first and second initiator devices and the plurality of expanders respectively include a plurality of physical ports assigned to a plurality of zone groups,
wherein the plurality of zone groups includes a first zone which is a zone group through which a command to be transmitted through the first initiator device passes and a command to be transmitted through the second initiator device does not pass, and
wherein a band of the first zone far from the first initiator device is narrower than a band of the first zone close to the first initiator device.

11. The storage system according to claim 10,
wherein the plurality of zone groups further includes a second zone which is a zone group through which a command to be transmitted through the second initiator device passes and a command to be transmitted through the first initiator device does not pass, and
wherein a band of the second zone far from the second initiator device is narrower than a band of the second zone close to the second initiator device.

12. The storage system according to claim 11,
wherein the first expander is an expander at one end of the expander sequence, and wherein the second expander is an expander at the other end of the expander sequence.

13. The storage system according to claim 10,
wherein the command transmitted by the processor includes an I/O command to input/output data from/to the storage device and an internal processing command which is a control command to cause the expander or the storage device to perform processing different from input/output of data,
each first zone and each second zone include an internal zone which is a zone group through which the internal processing command passes and the I/O command does not pass, and
wherein the internal processing command issued by the processor reaches the transmission destination device of the internal processing command through the physical port assigned to the internal zone.

14. A storage control method of a storage system including an expander sequence including a plurality of expanders coupled in series, a plurality of storage devices directly coupled to the expander sequence, a first initiator device directly coupled to a first expander which is one of the expanders in the expander sequence, and a second initiator device directly coupled to a second expander which is one of the expanders in the expander sequence and different from the first expander, the storage control method comprising:
selecting a path, with respect to a transmission destination device of an I/O command among the plurality of storage devices and the plurality of expanders, between the optimal path which is an initiator device with fewer expanders in a distance to the transmission destination device and a roundabout path which is an initiator device with more expanders in a distance to the transmission destination device,
transmitting the command to the transmission destination device through the selected path;
comparing, with respect to the transmission destination device, response time of the optimal path with response time of the roundabout path;
comparing, with respect to the transmission destination device, the number of I/O commands issued through the optimal path with the number of I/O commands issued through the roundabout path; and
selecting the optimal path with fewer expanders in the distance to the transmission destination device than the roundabout path, when the number of I/O commands of the optimal path is equal to or greater than the number of I/O commands of the roundabout path with more expanders in the distance to the transmission destination device than the optimal path, without regard to whether the response time of the optimal path is smaller than or equal to or longer than the response time of the roundabout path.

15. The storage control method according to claim 14, wherein the transmission destination device is one of the plurality of storage devices, the storage control method further comprising:
selecting the optimal path with fewer expanders in the distance to the transmission destination device than the roundabout path, when the number of I/O commands of the optimal path is equal to or greater than the number of I/O commands of the roundabout path and the response time of the optimal path is shorter than the response time of the roundabout path.

16. The storage control method according to claim 14, further comprising:

selecting the roundabout path with more expanders in the distance to the transmission destination device than the optimal path, when the response time of the roundabout path is shorter than the response time of the optimal path and the number of I/O commands of the roundabout path is greater than the number of I/O commands of the optimal path.

17. The storage control method according to claim 14, further comprising:
selecting, when the command is a read command, the optimal path with fewer expanders in the distance to the transmission destination device than the roundabout path, without regard to the response time of the optimal path and the response time of the roundabout path with respect to the transmission destination device.

18. A storage system comprising:
an expander sequence including a plurality of expanders coupled in series;
a plurality of storage devices directly coupled to the expander sequence;
a first initiator device directly coupled to a first expander which is one of the expanders in the expander sequence;
a second initiator device directly coupled to a second expander which is one of the expanders in the expander sequence and different from the first expander; and
a processor configured to transmit a command through one of the first and second initiator devices to a transmission destination device of the command among the plurality of storage devices and the plurality of expanders,
wherein the processor is configured to select a path, with respect to the transmission destination device, between the optimal path which is an initiator device with fewer expanders in a distance to the transmission destination device and a roundabout path which is an initiator device with more expanders in a distance to the transmission destination device, and to transmit the command to the transmission destination device through the selected path;
wherein the command is an I/O command;
wherein the processor is configured to compare, with respect to the transmission destination device, response time of the optimal path with response time of the roundabout path; and
wherein the processor is configured to compare, with respect to the transmission destination device, the number of I/O commands issued through the optimal path with the number of I/O commands issued through the roundabout path, and to select the roundabout path with more expanders in the distance to the transmission destination device than the optimal path, when the response time of the roundabout path is shorter than the response time of the optimal path and the number of I/O commands of the roundabout path is greater than the number of I/O commands of the optimal path.

\* \* \* \* \*